United States Patent [19]

Taylor

[11] 4,307,329

[45] Dec. 22, 1981

[54] WIRE GUIDANCE METHOD AND APPARATUS

[75] Inventor: Charles L. Taylor, Binghamton, N.Y.

[73] Assignee: The Raymond Corporation, Greene, N.Y.

[21] Appl. No.: 91,763

[22] Filed: Nov. 6, 1979

Related U.S. Application Data

[63] Continuation of Ser. No. 840,504, Oct. 7, 1977, abandoned.

[51] Int. Cl.³ .............................................. B62D 1/24
[52] U.S. Cl. .................................... 318/587; 180/168
[58] Field of Search ................. 180/168; 318/580, 587

[56] References Cited

U.S. PATENT DOCUMENTS

| Re. 30,492 | 1/1981 | Blakeslee | 318/587 |
|---|---|---|---|
| 2,339,291 | 1/1944 | Paulus et al. | 180/98 |
| 2,742,099 | 4/1956 | Hagen | 180/98 X |
| 2,847,080 | 8/1958 | Zworykin et al. | 180/98 |
| 3,009,525 | 11/1961 | DeLiban | 180/98 |
| 3,033,305 | 5/1962 | Harned et al. | 180/98 X |
| 3,498,403 | 3/1970 | Kohls | 180/98 |
| 3,669,209 | 6/1972 | Brooke | 180/98 |
| 3,993,156 | 11/1976 | Rubel | 180/98 |
| 4,040,500 | 8/1977 | Blakeslee | 318/587 X |
| 4,079,801 | 3/1978 | Dobson | 318/587 X |
| 4,083,422 | 4/1978 | Blakeslee et al. | 318/587 X |
| 4,253,541 | 3/1981 | Iida et al. | 318/587 X |

FOREIGN PATENT DOCUMENTS 2008281 5/1979 United Kingdom .

Primary Examiner—B. Dobeck
Attorney, Agent, or Firm—Richard G. Stephens

[57] ABSTRACT

A ground vehicle guidance system for following a current-carrying guidewire provides improved steering stability over a wide range of speeds and improved immunity to inductive field anomalies by computing vehicle heading and lateral displacement using sensor signals themselves substantially insensitive to heading variations, with the sensor signals being processed to provide steering command signals having specified relationships to vehicle steering geometry, so that desired damping factors can be obtained for both forward and reverse travel. Improved vehicle speed-limiting and stopping circuits control truck operation in accordance with computed heading and lateral displacement deviations independently from each other. Steering systems are illustrated both for vehicles using steerable wheels and vehicles steered by differential drive wheel speed control.

24 Claims, 27 Drawing Figures

WIRE GUIDANCE METHOD AND APPARATUS

This application is a continuation of my prior copending application Ser. No. 840,504 filed Oct. 7, 1977 now abandoned.

This invention relates to wire guidance method and apparatus, and more particularly to an improved control system for a wire-guided material transporting vehicle. The use of floor-embedded guide wires which provide alternating magnetic fields to steer vehicles such as lift trucks along prescribed paths in warehouses and the like is well-known, and described in the following U.S. Patents, as well as numerous others:

U.S. Pat. No. 2,339,291—Paulus et al;
U.S. Pat. No. 2,752,099—Hagen
U.S. Pat. No. 2,847,080—Zworykin et al;
U.S. Pat. No. 3,009,525—DeLiban
U.S. Pat. No. 3,033,305—Harned et al
U.S. Pat. No. 3,498,403—Kohls
U.S. Pat. No. 3,993,156—Rubel
U.S. Pat. No. 4,043,418—Blakeslee The majority of such systems utilize trucks which carry riding operators, and the invention will be described in connection with such a truck, although it will become apparent as the description proceeds that various concepts of the invention are also useful with riderless trucks.

It is very important, particularly when operating in narrow aisles, that lateral displacement of a truck from the guidewire be reliably controlled and limited due to the serious damage or injury which may be caused if a truck strikes a storage rack or the like. Because lateral displacement builds up or increases as the time integral of the product of vehicle speed and any heading error, it has been known to be desirable, particularly if a vehicle must operate at a fairly high speed, to anticipate and prevent displacement errors by accurately sensing and using vehicle heading to correct vehicle steering, and various sensor arrangements which respond to vehicle heading, as well as responding to vehicle lateral displacement, have been devised, including for example pairs or combinations of crossed concentric coils. See, for example, U.S. Pat. No. 3,009,525. For close tracking at high speeds, it can be shown that a vehicle sensor assembly should provide a steering correction signal which varies much more with heading than with lateral displacement. Otherwise stated, the sensor assembly should provide the same error-voltage for a small angular (heading) error as it does for a large displacement error. Thus one could say that such a sensor assembly should have a large heading to displacement sensitivity ratio in terms of inches per degree or inches per radian. It has been known that one can vary the sensitivity ratio of concentric coil sensor assemblies by tilting such combinations of coils. However, it has been found that extremely small tilt angles tend to have undesirably large effects, making the mounting of such assemblies critical and sometimes resulting an erratic operation if a floor is not level, for example. One object of the present invention is to provide an improved sensor arrangement which has a very large heading to displacement sensitivity ratio, but wherein operation is not dependent upon critical mounting adjustments.

A more serious problem of the prior concentric-coil sensor assemblies is that they are undesirably responsive to inductive field anomalies which tend to occur in usual guidewire installations, mainly due to expansion joints between floor slabs, or interruptions in the reinforcing bars or mesh used in concrete floors. Such reinforcing frequently tends to provide very distinct heading changes in the flux adjacent a guidewire of the same nature that kinks or bends in the guidewire might be expected to cause. When adjusted to be acceptably sensitive to heading changes, the prior concentric coil sensor arrangements have often tended to produce wild variations in steering signals as a vehicle passes over an expansion joint. The distrubances which such anomalies cause can be decreased by restricting vehicle travel to low speed, which may of course be undesirable, or by decreasing sensitivity to heading changes, which undesirably tends to allow greater displacement errors to occur at given vehicle speeds. Inasmuch as the discontinuities at an expansion joint may effect the flux direction in the same way as a heading change or turn of the guidewire, one might expect the problem to be inherently unsolvable. However, in accordance with the present invention, the problem is overcome to a large degree by computing vehicle heading from the outputs of sensor coils in an arrangement wherein coil voltages are substantially insensitive to heading changes. Thus one object of the invention is to provide an improved steering system in which a steering command signal having a large heading to displacement sensitivity ratio is provided by combining coil voltages which have very little or no sensitivity to heading changes.

A number of prior art guidance systems have been useful only with vehicles which travel at undesirably low speeds along a guidewire, with such systems experiencing unacceptable steering instability at higher vehicle speeds. A variety of attempts have been made to improve steering stability. One group of such prior attempts involved the mounting of the sensor assembly on a re-positionable arm or boom to provide a damping effect, such systems being shown in U.S. Pat. Nos. 2,339,291; 3,009,525 and 3,498,403 and being suggested in U.S. Pat. No. 2,847,080. The use of swingbooms or the like undesirably takes up space beneath a vehicle, or requires an increase in the total length of a vehicle, and requires added mechanism. Another object of the present invention is to provide an improved inductive guidance system having a sensor assembly which may be securely affixed to the vehicle, obviating any speed for a sensor-carrying boom or pivot mechanism, and which system is less sensitive to guidewire field anomalies, even at high vehicle speeds. Various prior art wire-guidance systems are disadvantageous in that their inductive sensor assemblies must be located within rather narrow limits at particular longitudinal positions along a vehicle. It may be desirable that a sensor assembly not be located near a wheel axis, for example, so as to allow room for traction gearing or other equipment, and it may be highly desirable to mount a sensor assembly away from various equipment such as motors or thyristor circuits to reduce the amount of electrical noise induced in the sensor assembly. Thus in numerous applications it becomes highly advantageous if one has freedom to mount a sensor assembly at one of many different longitudinal positions without seriously affecting steering stability, and provision of an improved wire-guided system allowing such freedom is another object of the invention.

U.S. Pat. No. 2,742,099 suggests the use of a rate insertion net-work to improve steering system stability. While the use of a rate insertion network may improve stability under certain operating conditions, it tends to make a steering system unduly susceptible to noise, and tends to accentuate disturbances which anomalies in the inductive field surrounding the guidewire tend to cause. Various prior patents (e.g. U.S. Pat. Nos. 2,847,080 and 3,009,525) have taught that orienting sensor coils to make the voltages induced in the coils vary substantially as a function of heading may have a beneficial damping effect. However, serious steering disturbances can arise if such systems encounter guidewire field anomalies. A further object of the invention is to provide an improved guidance system having better stability at higher vehicle speeds which is less affected by guidewire field anomalies.

In accordance with one concept of the present invention, the use of sensor boom re-positioning, rate insertion and like techniques to increase steering system damping may largely be dispensed with, with a specific relationship being established between steering system sensitivity to heading errors, sensitivity to lateral displacement errors and vehicle wheelbase, and with a vehicle steering position servo or a drive wheel speed control system being provided with a frequency response or bandwidth exceeding what may be termed the natural frequency of the vehicle system, by a prescribed amount or factor over the speed range of interest, and provision of an improved guidewire steering system utilizing such relationships is another important object of the present invention. The meaning of the term "natural frequency of the vehicle system" will be made clear below.

A number of prior art guidance systems tend to be useful for only one direction of vehicle travel, i.e. forward or reverse, and have had to be largely duplicated in order to steer a vehicle in both directions. A further object of the present invention is to provide an improved guidance system which can be used for both directions of travel, with either the same or different steering characteristics provided for the two directions, as may be desired, and which system requires very little switching or re-connection when vehicle travel is changed from forward to reverse or vice versa. Some prior guidance systems experience difficulties in initially beginning automatic steering or "acquiring" the guidewire if tailored to track the wire closely, and another object of the invention is to provide an improved wire-guided steering system in which acquisition of the wire can be provided without a need to first align the truck extremely precisely with the guidance, and in which acquisition of the guidewire can be readily accomplished from an initial position on either side of the wire.

For safety's sake, it is often very important that an automatically steered vehicle be stopped if its heading or its lateral displacement relative to the guidewire exceeds a predetermined heading deviation angle or displacement distance. Many prior art guidance systems produce voltages which are combined or composite functions of lateral displacement and heading, rather than separate voltages which vary in accordance with those deviations, making it difficult to set accurate limits on the two individual deviations. A further object of the present invention is to provide an improved sensor assembly which also provides separate heading and lateral displacement deviation voltages, so that the limits of those two types of deviations may be set individually, independently of each other.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1a is a geometric diagram useful in understanding automatic steering of a vehicle steered by means of a steerable wheel. FIG. 1b is a graph useful in understanding the effects which various adjustments may have in various embodiments of the invention.

FIG. 2a is a plan view diagram illustrating the layout of sensor coils in one form of improved sensor assembly; FIGS. 2b and 2c are elevation and plan view diagrams, respectively, illustrating several possible modifications to the arrangement of FIG. 2a; FIGS. 2d, 2e and 2f are plan and elevation views and a graph, respectively, useful in understanding operation of the improved sensor assembly, and FIG. 2g is a plan view diagram useful in understanding how certain signals developed by the improved sensor assembly vary with vehicle heading and displacement from a guidewire.

Figure 7:
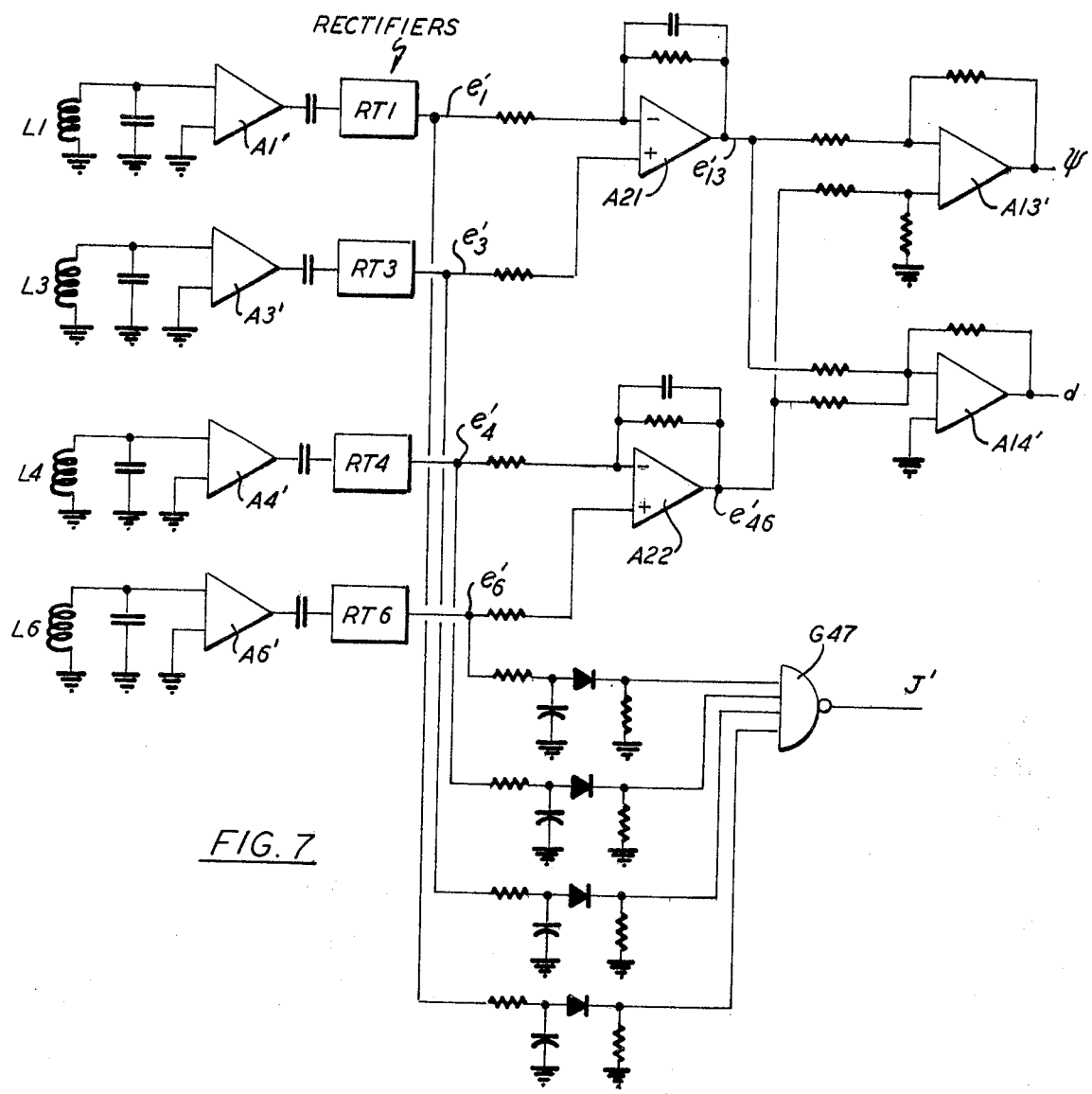
Figure 7A:
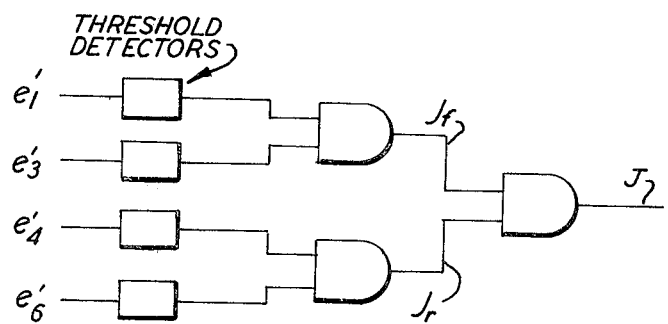
Figure 7B:
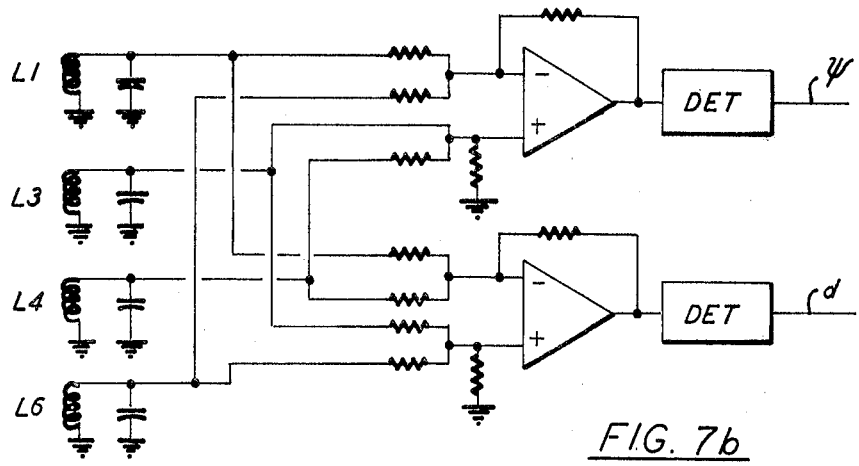
Figure 7C:
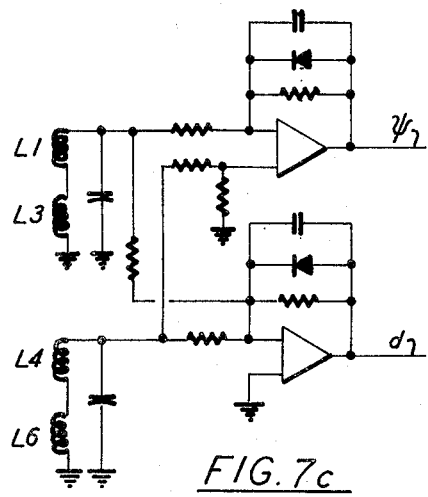
Figure 7D:
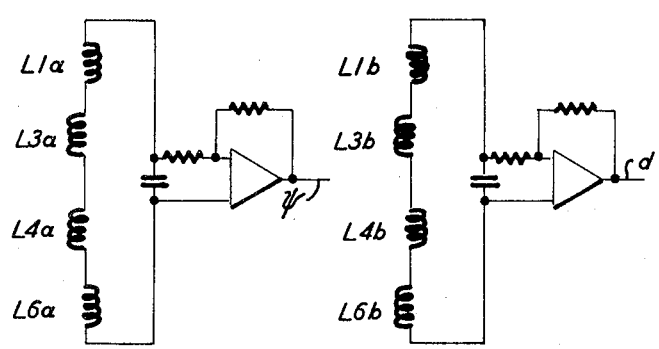
Figure 7E:
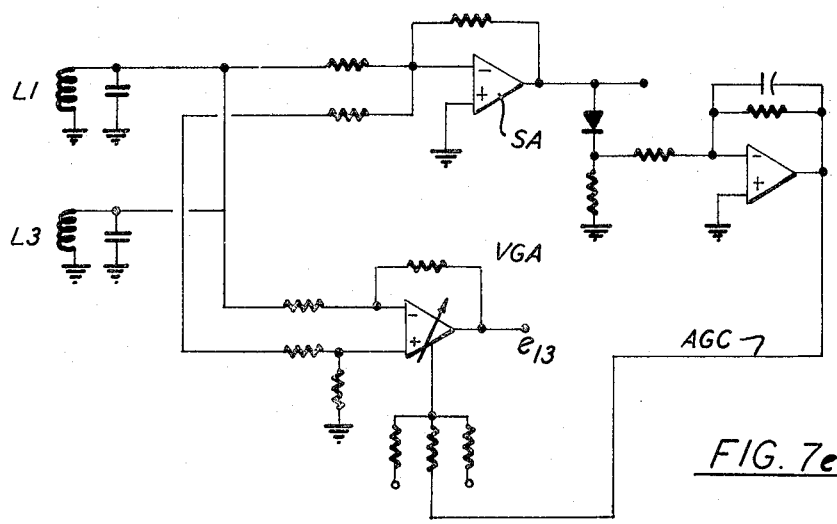

FIG. 7 is an electrical schematic diagram illustrating an alternate form of sensor assembly using amplitude detection, and FIG. 7a illustrates one possible modification to the circuit of FIG. 7. FIGS. 7b, 7c and 7d illustrate alternative forms of sensors constructed in accordance with the invention, and FIG. 7e illustrates one form of gain-control circuit which may be used with various embodiments of the invention.

Figure 4:
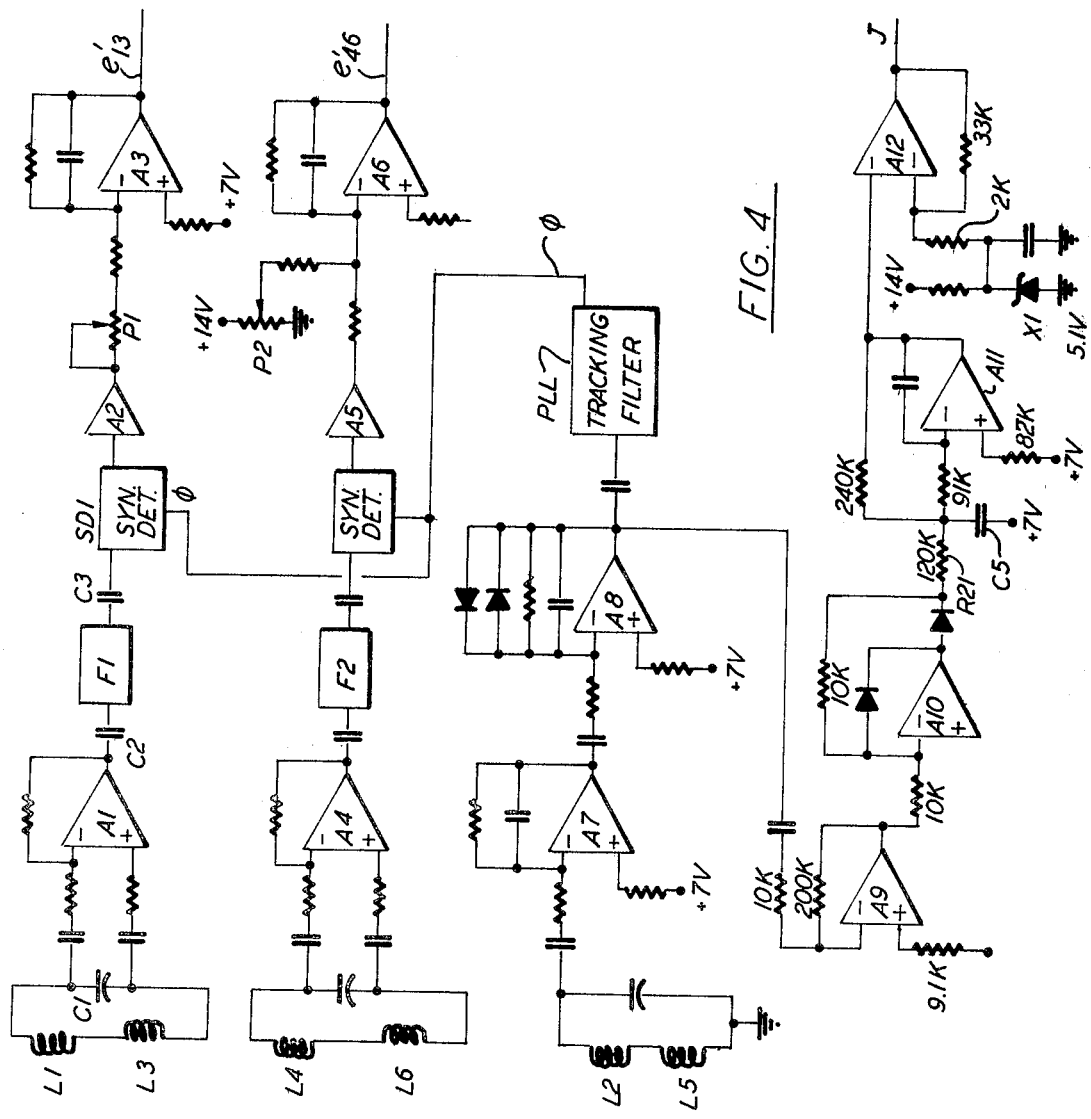
FIG. 4 is an electrical schematic diagram further illustrating a preferred form of sensor assembly constructed in accordance with the invention.
Figure 5:
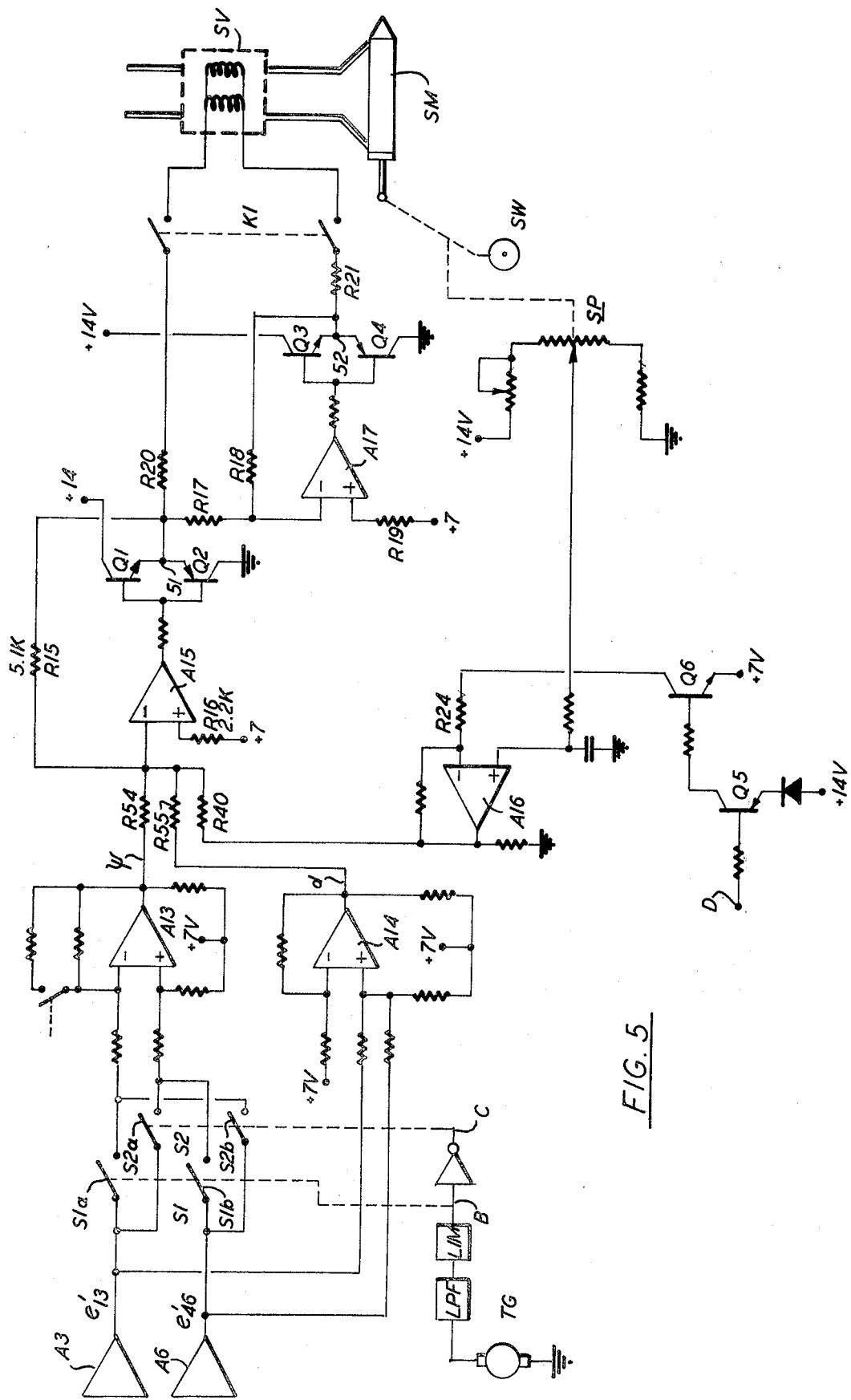
FIG. 5 is an electrical schematic diagram illustrating signal processing circuits and a position servo system connected to be operated by the sensor system of FIG. 4.
Figure 8:
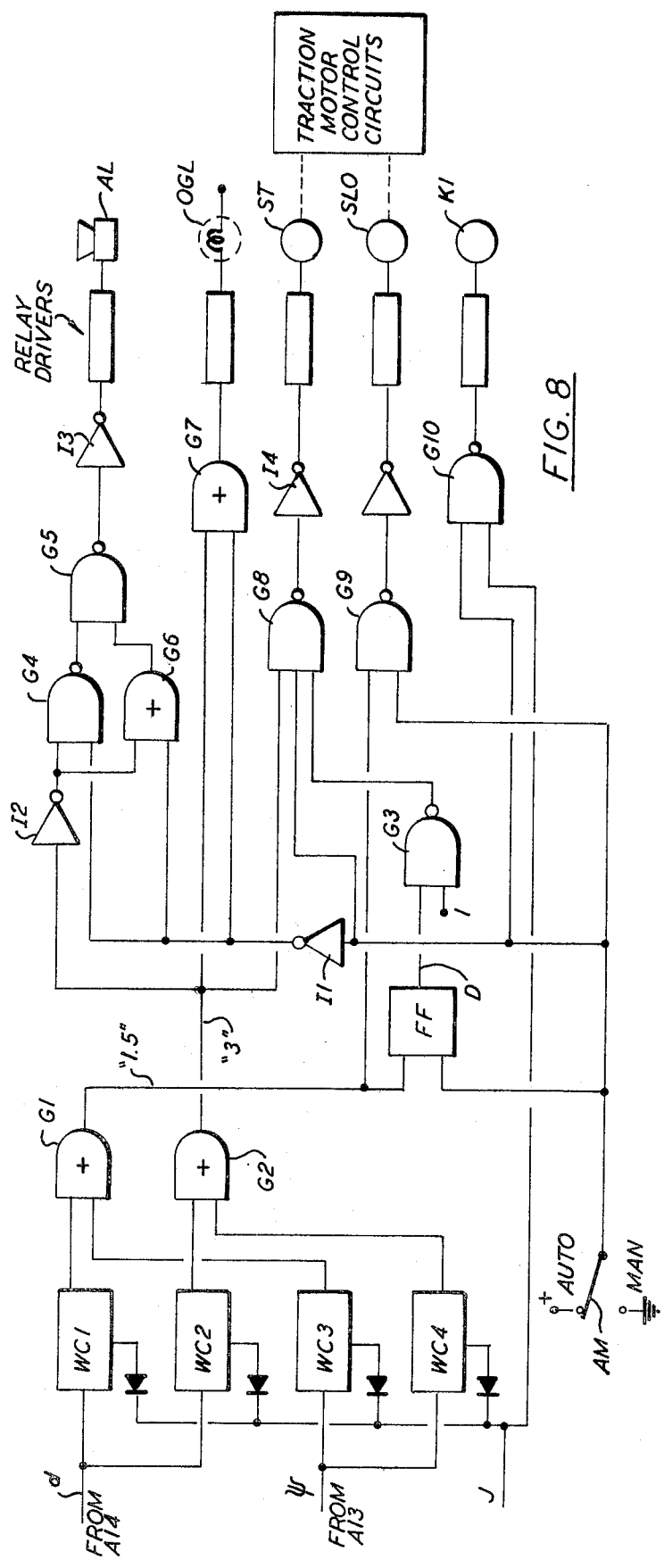
Figure 8A:
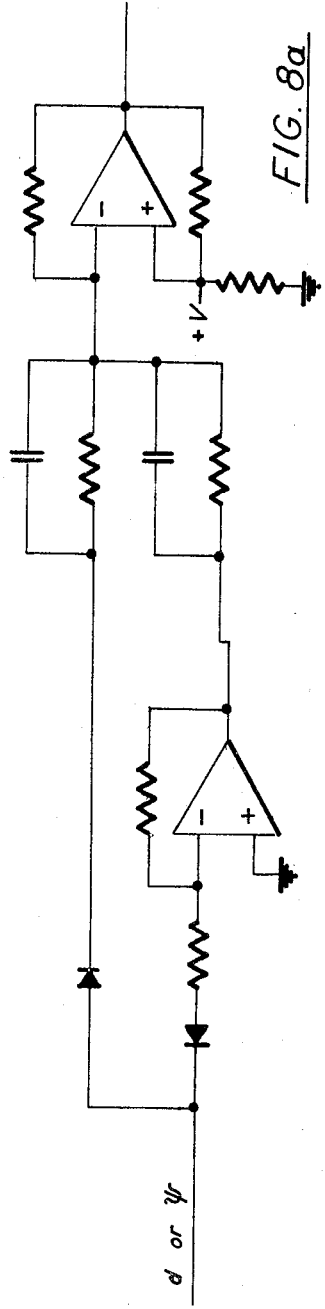

FIG. 8 is a logic diagram illustrating certain control and indicating circuits useful with the device of FIGS. 4 and 5. FIG. 8a illustrates one modification which may be made to bi-directional comparator circuits shown in block form in FIG. 8.

Figure 9:
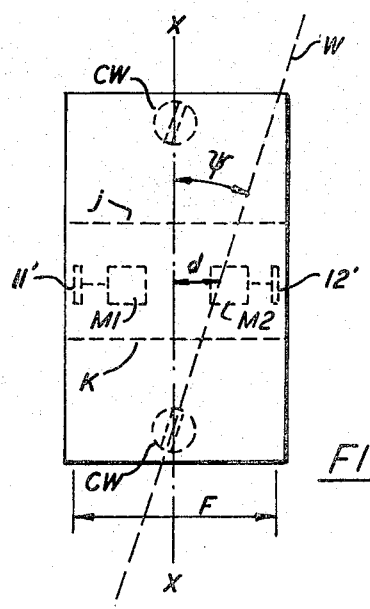

FIG. 9 is a plan view geometric diagram useful in understanding steering by differential drive wheel speed control.

Figure 10A:
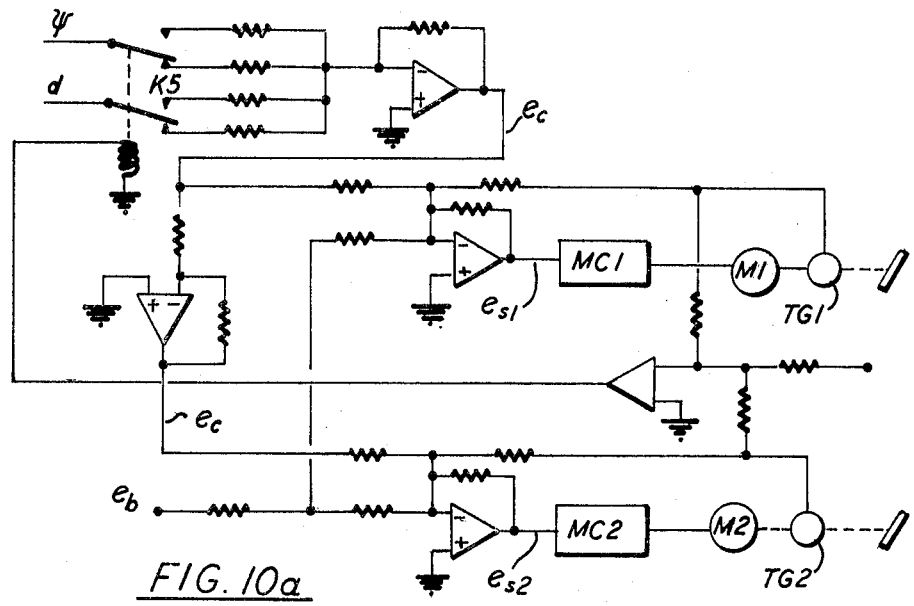

FIG. 10a is a schematic diagram illustrating portions of one form of differential drive wheel steering system with which the invention may be used.

Figure 10B:
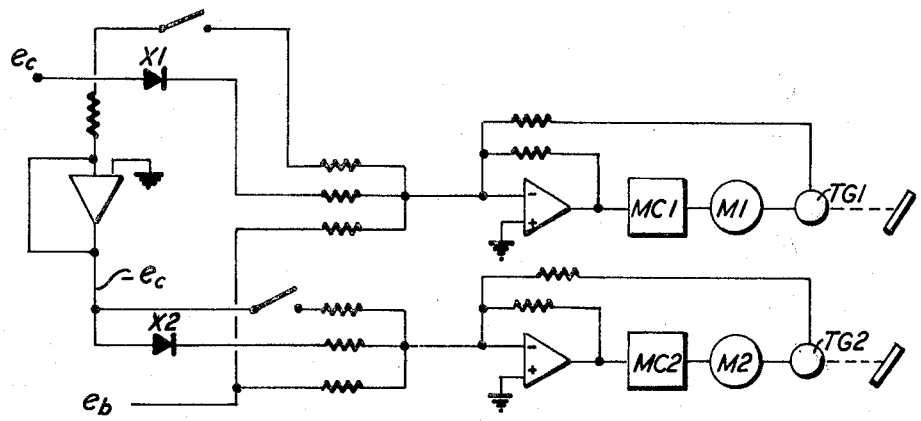

FIG. 10b is a schematic diagram illustrating portions of an alternate form of differential drive wheel steering system.

Figure 10C:
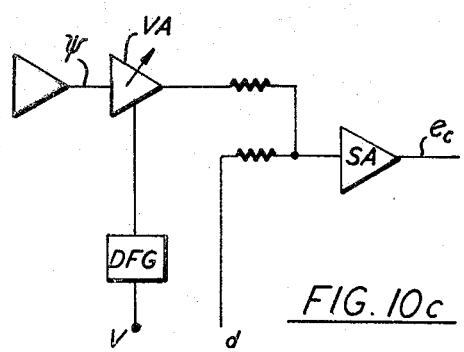

FIG. 10c is a schematic diagram illustrating a feature which may be used with steering systems of the types shown in FIGS. 9, 10a and 10b.

Figure 1A:
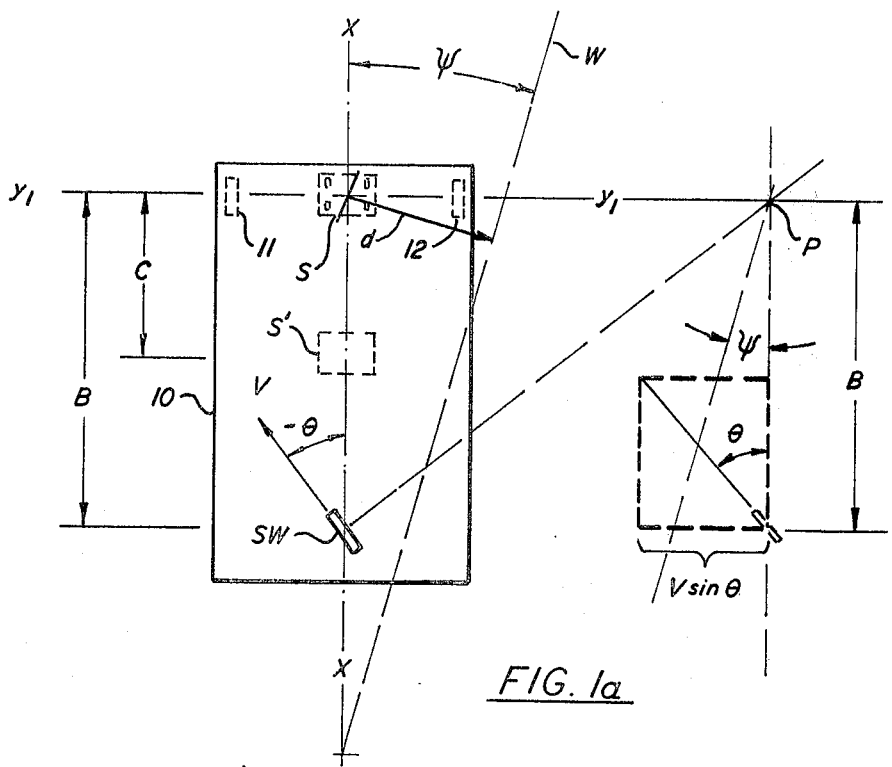

In the plan view diagram of FIG. 1a, a vehicle 10 is assumed to be supported at one end on a pair of non-dirigible, unpowered load wheels 11, 12 spaced laterally apart on a lateral axis $y_1$ at equal distances from a vehicle longitudinal axis x—x, and to be supported near its other end on a steerable drive wheel SW shown located on axis x—x at a wheelbase distance B from the load wheels. It is by no means necessary to the following analysis nor essential to the invention that steerable wheel SW be a powered wheel, e.g. wheels 11, 12 could instead be driven. Similarly, the vehicle could instead use a pair of spaced apart steerable wheels rather than a single steerable wheel, a single such wheel being shown merely for sake of simplicity.

If steerable wheel SW moving at velocity V is turned at an angle $-\theta$ from the x axis, the vehicle turns about a centerpoint of rotation P, which is the intersection of the normal to the plane of wheel SW and the load wheel axis $y_1$, as is well known. In FIG. 1a the vehicle x axis is shown situated at an exaggerated heading angle $\psi$ with respect to a buried guidewire W. A sensor assembly S is shown mounted at the intersection of the x axis and the load wheel axis $y_1$. Translating the guidewire, the sensor, and the vehicle longitudinal axis to the center of rotation P, one can readily find that the time rate of change $\omega$ of heading $\psi$ of the vehicle and sensor S is described by:

$$\omega = \frac{d\mu}{dt} = \frac{V \sin \theta}{B} \text{ or } \mu = \frac{V \sin \theta}{Bp}$$

where p is the differential operator d/dt. Making the small-angle approximation that $\sin \theta = \theta$ in radians, one can write:

$$\psi = (V\theta/Bp) \tag{1}$$

The lateral velocity dd/dt at which a point on the axis $y_1$ and hence sensor S departs from the wire W can be shown to equal $(dd/dt) = V \sin \psi \cos \theta$ Making small-angle approximations that $\sin \psi = \psi$ in radians and $\cos \theta$ equals unity, one then can state that $$(dd/dt) = V \psi \text{ or } d = (V \psi/p) \tag{2}$$

The problem of steering the vehicle manifestly involves that of controlling the steering angle $\theta$ so that heading $\psi$ and lateral displacement d relative to wire W are maintained small and driven so as to approach zero at all contemplated vehicle velocities. The several small-angle approximations made above can be recognized as justifiable approximations for typical high-speed vehicle travel, which ordinarily occurs along a substantially straight section of guidewire.

Assuming a simple proportional control system wherein steering wheel angle $\theta$ is automatically made directly proportional to lateral displacement d and heading angle $\psi$ with respective constant scale factors $K_1$ and $K_2$, one may write:

$$-\theta = K_1 d + K_2 \psi \tag{3}$$

By solving equations (1), (2) and (3) to eliminate $\theta$, one can derive the following characteristic equation:

$$Bp^2 + K_2 Vp + K_1 V^2 = 0 \tag{4a}$$

or $$p^2 + (K_2 Vp/B) + (K_1 V^2/B) = 0 \tag{4b}$$

Equation (4b) can be shown to have the form of a classical second-order differential equation. The second and third coefficients of such an equation can instead be written as $2\zeta\omega_n$ and $\omega_n^2$, respectively, where $\omega_n$ is the undamped natural frequency of the system described by the equation and $\zeta$ is termed the damping ratio. Substituting such notation into equation (4b), one can determine that the system natural frequency $$\omega_n = V\sqrt{K_1}/B \tag{5a}$$

and that the damping ratio is given by:

$$\zeta = (K_2/2\sqrt{K_1 B}) \tag{5b}$$

The damping ratio determines whether and how much the system described by the characteristic equation will overshoot as it returns toward a zero or balanced condition following a disturbance. A critical damping ratio of unity will cause rebalancing without overshoot in a minimum time, while a smaller damping ratio will allow overshoot, and a larger damping ratio will cause a sluggish return to a balanced condition. It can also be shown that the actual frequency of any damped oscillation will equal $\omega_n\sqrt{1-\zeta^2}$.

It is very important to note in connection with expression (5b) that the damping ratio, which determines whether the system will oscillate, is not a function of vehicle speed under the conditions assumed, but merely directly proportional to heading sensitivity and inversely proportional to the square root of both wheel base B and the lateral displacement sensitivity $K_1$. Thus for a vehicle having a given wheelbase, a desired steering characteristic, such as critical damping, for example, can be provided by proper selection of the sensor lateral displacement and heading sensitivities, $K_1$ and $K_2$, taking into account the wheelbase B. For example, for critical damping, the ratio between heading sensitivity and lateral displacement sensitivity should follow the relationship $$(K_2^2/K_1) = 4B \tag{6}$$

Thus if a vehicle has a wheelbase B of 100 inches and the sensor assembly is arranged to turn the steering wheel 1.0 milliradian per 1.0 milliradian of heading error (i.e. $K_2 = 1.00$), then the sensor assembly should be arranged to turn the steerable wheel (1/400) radian or 2.5 milliradian per inch (2.54 cm.) of lateral displacement. It is by no means necessary for a practical application that exact critical damping (damping ratio of 1.00) be provided, as some overshoot will be deemed acceptable in many applications, and some sluggishness (overdamping) will be deemed acceptable in many applications. It is contemplated that in the practice of the invention with such a steerable wheel vehicle the damping ratio ordinarily should lie within the range of 0.5 to 1.5, and hence that the ratio $K_2^2/K_1$ will lie within the range B to 9B.

It should be noted that equation (3) assumed above assumes steering wheel angle to be directly proportional to lateral displacement and heading components, the absence of any p term in equation (3) inherently assuming that a steering actuator responds to position the steering wheel without appreciable time lags in response to changes in the sensor assembly output signals, or in essence that such a steering servo has great bandwidth. In accordance with the invention, that assumption is approximated by insuring that the steering servo system has a bandwidth or frequency response substantially exceeding the natural frequency of the vehicle at the maximum contemplated speed of the vehicle. With the exemplary vehicle constants assumed above, the natural frequency of the vehicle varies from zero in an amount proportional to vehicle speed, reaching a value of 0.60 radian per second at vehicle speed of 120 inches per second. By insuring that the steering motor servo has a frequency response greatly exceeding such an angular frequency, such as a response down 3 db at 5 hertz, for example, vehicle speeds exceeding 120 inches per second may be readily used, with critical damping closely approximated over the entire speed range of the vehicle. There is no theoretical maximum limit to the bandwidth which the steering servo should have, but increasing the steering servo bandwidth beyond say 10 times the vehicle natural frequency at top speed may tend to be difficult or wasteful in some applications. It is contemplated that in the practice of the invention the steering servo frequency response ordinarily will be 2 to 10 times the vehicle natural frequency at top speed, unless greater bandwidth is readily available at insignificant cost. The steering servo frequency response in an actual vehicle varies appreciably with vehicle speed and with the load on the steerable wheel or wheels. In specifying the range of 2 to 10 in the preceding sentence, I contemplate that steering servo frequency response, defined by the "down 3 db" point, be measured at the maximum vehicle speed at which automatic guidance is intended to be used, and with the vehicle carrying a minimum or no load. The frequency response of the steering servo can be measured in a conventional fashion by applying command signals of increasing frequency and recording the output of the steering servo feedback potentiometer. In practice the frequency response of the steering servo under such conditions often can be approximated quite closely by testing the servo with the vehicle stationary, with a layer of grease applied to the floor beneath the steerable wheel. The frequency response is tested, of course, over the small range of steering angles which occur during travel at high speeds.

While equation (5) above establishes the *ratio* between the sensitivity coefficients $K_1$ and $K_2$ which one should provide for a vehicle having a given wheelbase to establish a desired stability characteristic (damping ratio), it does not establish a particular value for either of those coefficients. The actual values selected will tend to vary somewhat in different applications and involve some compromise. If $K_1$ and $K_2$ are given very small values, the vehicle natural frequency will be quite small even at top speed, and the steering servo will require very little bandwidth, but the vehicle will require extensive time and travel distance for a deviation from the guidewire to be corrected, and vehicle deviations may exceed those deemed safe, or even those at which the sensor signals become so weak as to render the system inoperative. Conversely, if $K_1$ and $K_2$ are given very large values, the vehicle will correct for deviations much more rapidly and in shorter distances, but vehicle natural frequency will be greater at top speed, tending to require greater steering servo bandwidth, but, more importantly for many applications, the use of very large $K_1$ and $K_2$ values increases system sensitivity to anomalies in the guidewire field, a very large $K_2$ particularly resulting in serious disturbances from heading anomalies in the inductive field if such anomalies are encountered. Thus the optimum values of $K_1$ and $K_2$ for a given vehicle will usually tend to depend upon how severe the field anomalies are in the guidewire system where the vehicle is to be used, and in some cases may depend upon the costs involved in insuring adequate servo frequency response. In one successful embodiment of the invention used with a truck having a wheel-base of 80 inches and a maximum speed of 120 inches per second, a $K_2$ value of 2.0 was used, i.e. a command signal developed by the sensor assembly was arranged to turn the steerable wheel 2.0 milliradians per 1.0 milliradian of heading error, and to provide critical damping a $K_1$ value of about 0.0125 radians per inch (0.03175 radians per cm.) was provided, in accordance with equation (5). Successful operation was also achieved with a $K_2$ value of 2.0 and a $K_1$ value of about 0.0375 radians per inch, or a $K_2$ to $K_1$ ratio of 53.3, providing slightly under-damped operation. I believe that ratios between $K_2$ and $K_1$, a factor of 160 inches per radian (406 cm. per radian) in the critically damped case and a factor of 53.3 inches per radian (135 cm. per radian) in the under-damped case, resulted in heading to displacement sensitivity ratio greater by orders of magnitude than those used in most prior inductive guidance systems. In providing optimum values for $K_1$ and $K_2$ for a given vehicle, it will be apparent that it is extremely desirable if the factors $K_1$ and $K_2$ can be adjusted independently of each other, and provision of a sensor assembly which readily allows such adjustment is believed to be an important feature of the invention.

Having read the great heading sensitivity (a large $K_2$ value) increases the disturbances which heading anomalies in the inductive field tend to cause, the reader may wonder how the system of the invention can tolerate use of such great heading sensitivity. The answer lies in the sensor arrangement wherein vehicle heading is computed from coil voltages which do not themselves vary appreciably with heading, as explained in greater detail in connection with FIGS. 2a–2g and FIG. 3.

Figure 2A:
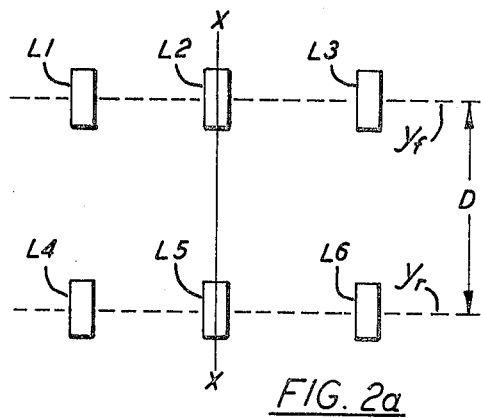

In the plan view of FIG. 2a the sensor assembly is shown in a diagrammatic plan view as comprising six coils L1 to L6, each preferably comprising a short geometrical solenoid. Each coil will be described as having a coil "plane", a plane parallel to which most of the turns extend, it being recognized that the coils have some thickness, and a central axis perpendicular to a coil plane will be termed the coil axis. In FIG. 2a each coil plane extends substantially parallel to a vehicle longitudinal axis x. Coils L1 to L3 are shown located spaced apart from each other on a lateral axis $y_f$, with coils L1 and L3 spaced equal distances on opposite sides of longitudinal axis x on which coil L2 is centered. Coils L4 to L6 are shown similarly spaced apart from each other on a second lateral axis $y_r$, with coils L4 and L6 spaced equal distances on opposite sides of the x axis, on which coil L5 is located. Lateral axis $y_r$ extends parallel to lateral axis $y_f$ at distance D therefrom. In one successful embodiment of the invention, coils L1 to L6 each comprised a coil having about 4000 turns of #36 wire wound in a coil having a mean diameter of 1.5 inches (3.81 cm.) and an axial width of 0.6 inches (1.5 cm.). The coils were mounted on the vehicle with their centers about 2.25 inches (5.72 cm.) above the floor, for use with a guidewire buried one-half inch (1.25 cm.) below the floor surface and carrying a current of the order of 100 ma. at 5.2 kilohertz. The distance between coils L1 and L3 and that between coils L4 and L6 was about 9.5 inches (24.13 cm.) and the distance D between axes $y_f$ and $y_r$ was about 16 inches (40.6 cm.). Distances D within the range of 8 to 36 inches (20.32 to 91.44 cm.) have been successfully used, and lateral coil spacings within the range of 4 to 12 inches (10.16 to 30.48 cm.) have been successfully used.

In FIG. 2a axes $y_f$ and $y_r$ are assumed to be horizontal axes. It is possible and within the scope of the invention, to instead tilt the outer coils, so that their axes each have a vertical component as well as extending parallel to the $y_f$ and $y_r$ axes, as is illustrated for coils L1 to L3 in FIG. 2b. Such tilting tends to increase the voltages induced in the tilted coils since the flux from guidewire W then cuts the turns of those coils more perpendicularly. FIG. 2b also illustrates that center coil L2 need not necessarily lie at the same vertical position as coils L1 and L3 though it may, nor must coil L2 necessarily have the same diameter as coils L1 and L3, though it may. Furthermore, as illustrated in FIG. 2c, central coil L2 need not necessarily lie at the same longitudinal position as coils L1 and L3. The same freedoms exist in the relationships of coil L5 to coils L4 and L6. It is not necessary that the coils be circular in cross-section; they could, for example, have a square cross-section. However, in practice I prefer to make each trio (L1 to L3 or L4 to L6) of coils of uniform diameter and to place them in or wind them on a non-magnetic cylindrical tube for sake of mounting convenience. In some applications of the invention it may be deemed desirable to provide ferrite cores in the coils. In some applications of the invention, coils L2 and L5 could be replaced by a single coil mounted on the x axis, preferably midway between axes $y_f$ and $y_r$ if the vehicle is to approach and "acquire" the guidewire from either side of the guidewire. It also may be mentioned at this point that while the preferred form of sensor assembly being described in connection with FIGS. 2a–2g is shown utilizing six coils and is arranged to use phase detection, an alternate embodiment of sensor assembly described below in connection with FIG. 7 uses only four coils, and uses amplitude detection.

If one assumes that a guidewire extends along axis x in FIG. 2a, it becomes readily apparent by reason of symmetry that voltages of equal amplitude will be induced in similar coils L1 and L3, and that voltages of equal amplitude will be induced in similar coils L4 and L6. In accordance with one aspect of the invention the voltages from coils L1 and L3 are differentially combined, as by connecting coils L1 and L3 series-opposing, and the pair of voltages from coils L4 and L6 are similarly differentially combined. Thus the resultant $e_{13}$ of the voltages induced in coils L1 and L3 and the resultant $e_{46}$ of the voltages induced in coils L4 and L6 are each zero when the vehicle x axis is centered directly above the guidewire. The voltages from central coils L2 and L5 are combined cumulatively, however, as by connecting these two coils series-aiding, so that the resultant voltage $e_{25}$ has a maximum value when the vehicle x axis is centered directly above the guidewire.

Figure 2D:
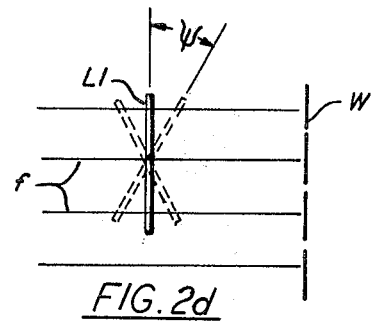
Figure 2B:
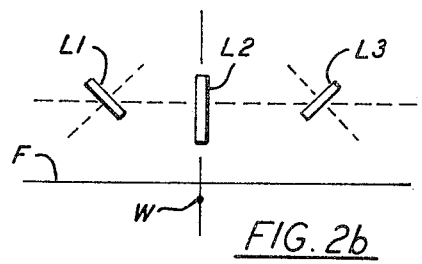
Figure 2E:
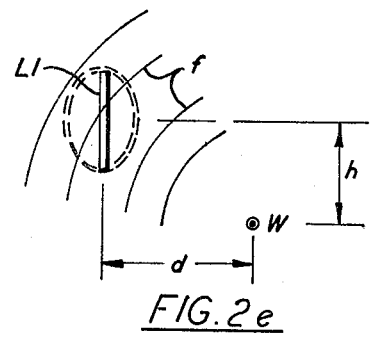
Figure 2C:
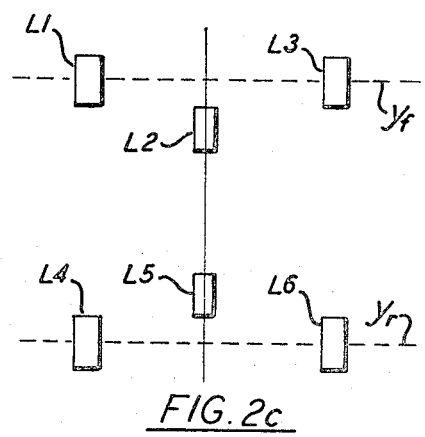

In FIGS. 2d and 2e a coil L1 is shown situated leftwardly from (as well as above) a guidewire W, from which flux line f,f extend. When the plane of the coil is parallel to wire W, maximum voltage will be induced in the coil, and if the coil is rotated about a vertical axis, such as to either of the dashed-line positions shown, the voltage will decrease substantially cosinusoidally with the angle of rotation $\psi$. For small heading angles the value of the cosine does not vary appreciably, and thus when the vehicle travels at high speed along a guide wire section having a uniform inductive field, i.e. no appreciable heading anomalies in its inductive field, the magnitude of the voltage induced in the coil does not change appreciably, assuming that the lateral distance of the coil from the wire does not change. If the coil is moves horizontally and/or vertically, the magnitude of the voltage induced in it will also vary, by factors dependent upon coil diameter and its height above the guidewire. If the coil center height h above the guidewire and the coil diameter are small, a given lateral displacement of the coil of say 0.5 inch (1.25 cm.) will cause a much greater proportional variation in coil output voltage than heading changes of say 5 degrees will cause. Thus the coil voltage may be deemed to be substantially insensitive to heading changes over the range of heading variations one might expect to encounter during high speed travel. The coil voltage manifestly does vary with heading, however, for very large heading deviations, and would approach or be zero for a heading angle of 90 degrees. If one compares the heading change (for small-angle deviations from a zero heading) required to provide a given voltage variation in a coil with the lateral displacement (from a reference lateral position) required to provide the same voltage variation in the coil, one may characterize a coil as having a given small-angle heading to displacement sensitivity ratio in dimensions such as degrees per inch or degrees per centimeter, such a ratio being very large if the coil is much more sensitive to displacement than to heading. In the practice of the invention, each of coils L1, L3, L4 and L6 is arranged so to have a large heading to displacement sensitivity ratio, preferably of the order of 100 degrees per inch (39.4 degrees per cm.) or greater. The exemplary coil arrangement for which dimensions are given above provides a ratio of the order of 200 degrees per inch (78.7 degrees per cm.) for each of coils L1, L3, L4 and L6.

Figure 2G:
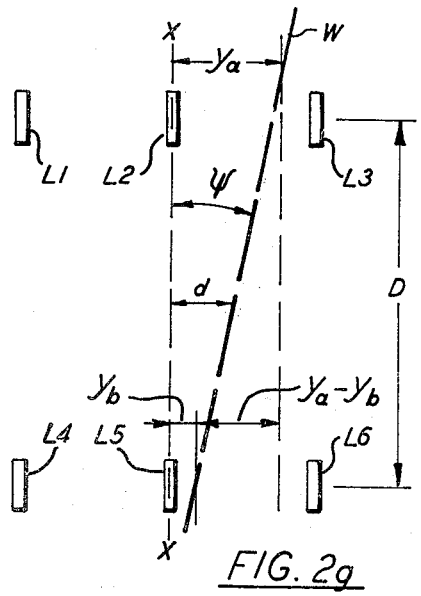
Figure 2F:
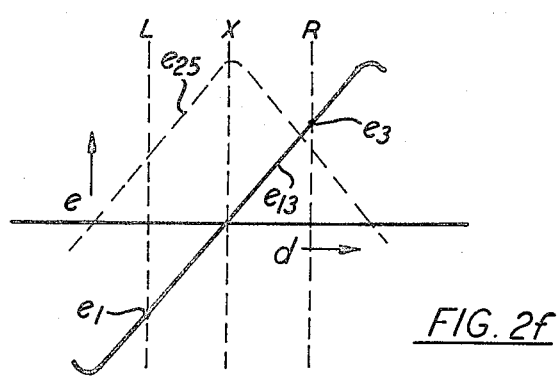

In FIG. 2f coil L1 of FIGS. 2d and 2e is assumed to lie at axis L, to the left of a guidewire at axis x, so that a voltage having a magnitude and phase or alternating polarity of the nature indicated by ordinate $e_1$ is induced in the coil. The "S curve" in FIG. 2f illustrates the manner in which the voltage induced in each coil varies with the lateral displacement d of the coil from the guidewire. If coil L3 is located on axis R shown an equal distance from the wire in its opposite side, its induced voltage $e_3$ will be equal in magnitude and opposite in phase from voltage $e_1$. If voltages $e_1$ and $e_3$ are combined, such as by connecting them to oppose each other, their resultant will then be zero, as already stated above. If the two coils are moved laterally in one direction or the other, the induced voltage in one will increase and that in the other will decrease. Thus the S curve in FIG. 2f may be deemed also to represent the magnitude and phase, or instantaneous polarity, of the resultant of the two coil voltages as they are together moved relative to the guidewire. If the two coils are rotated together in either direction from a zero heading angle, voltages $e_1$ and $e_3$ will both decrease, in very small amounts per degree of heading because of their large heading to displacement sensitivity ratio for small heading angles, but because the two voltages are combined to oppose each other, the two decreases even tend to cancel each other for large changes in heading angle, so that the composite voltage $e_{13}$ has a very small heading to displacement sensitivity ratio for both small and large changes in heading angle. Due to the similarity of their arrangement, it will be apparent that voltages $e_4$ and $e_6$ from coils L4 and L6 also have little or no sensitivity to heading changes over small angles, and that the composite voltage $e_{46}$ derived by combining them has a very small heading to displacement sensitivity ratio for both small and large heading deviations.

The voltages $e_2$ and $e_5$ are each a maximum when those coils are directly above the guidewire. Thus the resultant $e_{25}$ of those two voltages when they are combined to aid or add to each other, is of the nature shown in FIG. 2f.

With the stated requirement that a vehicle steering correction signal vary much more with heading deviations than with displacement from the guidewire, the deviation of voltages $e_{13}$ and $e_{46}$ to provide such a correction signal, with both of those voltages varying much less with heading than with displacement, and indeed both being essentially unresponsive to heading changes, may seem completely counterproductive, tending to provide the opposite of what is desired. However, the manner in which the heading signal may be derived from signals essentially unresponsive to heading will now be explained in connection with FIG. 2g. In FIG. 2g the coil sensor assembly is assumed to be mounted on a vehicle, the longitudinal or x axis of which is aligned at a heading angle $\psi$ relative to guidewire W, with the sensor also laterally displaced from the guidewire W. From the preceding explanation it will be apparent that the resultant voltage $e_{13}$ will be proportional to the distance $y_a$ in FIG. 2g, and that the resultant voltage $e_{46}$ will be proportional to distance $y_b$, and that neither of those voltages varies appreciably with heading. However, the tangent of the angle $\psi$ (or the angle $\psi$ in radians for small angles) is manifestly equal to $(y_a - y_b)/D$. Thus it will become apparent that heading is directly proportional to the difference between voltages $e_{13}$ and $e_{46}$ and inversely proportional to the fixed distance D, or:

$$\psi \approx (e_{13} - e_{46})/D \qquad (7)$$

Figure 3A:
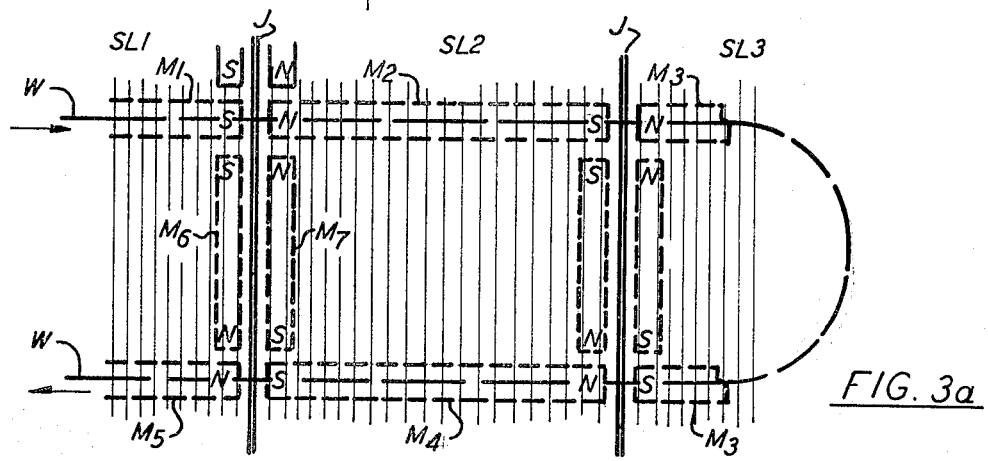
FIG. 3a is a plan view diagram and FIG. 3b is a graph, both being useful in understanding how floor construction in typical warehouse installations causes anomalies in the inductive field provided by a current-carrying guidewire.
Figure 3B:
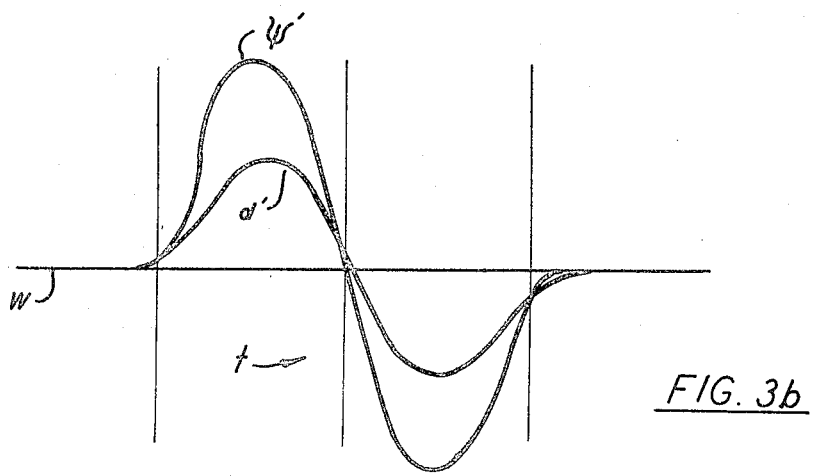

Further, an average lateral distance d of the sensor assembly from the guidewire will be seen to be given by:

$$d = (y_a + y_b)/2 \approx (e_{13} + e_{46})/2 \qquad (8)$$

where d is the lateral distance from the guidewire of a reference point on the x axis midway between the axes $y_f$ and $y_r$. In accordance with one important aspect of the invention, vehicle heading $\psi$ and lateral displacement d relative to the guidewire may be computed in accordance with the two last expressions above, to provide signals required for computation of a steering command signal. It is not strictly necessary that voltages $e_{13}$ and $e_{46}$ be weighted equally when computing lateral displacement, as weighing one more than the other merely moves the reference point from which lateral displacement is measured in one direction or the other along x axis. It is shown below that heading $\psi$ and displacement d alternatively can be computed using equivalent but more general expressions than those at (7) and (8). It is important to note heading is computed by combining induced coil voltages, none of which vary appreciably with heading either during normal steering at substantial speeds along the guidewire, a condition where only small heading angles are involved, nor vary greatly if a large heading anomaly in the guidewire field is encountered simultaneously by either pair of coils whose voltages are differentially combined. One marked advantage of such an arrangement may be better understood by reference to FIGS. 3a and 3b. In FIG. 3a a guidewire represented by a heavy dashed line at W is assumed to carry a current in an instantaneous direction shown by arrows, and is shown curved at one end to extend in two directions, as it might in order to pass down two adjacent aisles in a warehouse, for example. Floor joints shown as pairs of lines at J,J represent expansion joints between separate slabs of the warehouse floor, FIG. 3a showing portions of three slabs SL1 to SL3. Light vertical lines in FIG. 3a represent reinforcing bars or mesh used in the slabs. A principal reason that disturbances or anomalies occur in the field around the guidewire is believed to be because of the discontinuities in the magnetic circuits which occur at the expansion joints. With current flowing in a given direction in the guidewire at a given instant, it will be understood that the guidewire field magnetizes the metal reinforcing. Such magnetization may be visualized in a simplified fashion by imagining a plurality of bar magnets such as the elongated rectangles shown in dashed lines at $m_1$, $m_2$, etc. in FIG. 3a. With a given direction of current assumed, one end of each magnet section becomes a north pole and the other a south pole. Thus following the guidewire in the current direction shown from magnet $m_1$ to magnet $m_5$, one can see that the magnetic polarity of the floor-reinforcing magnetization changes polarity at each of the expansion joints J,J. Further, if the righthand edge of slab SL1 is magnetized with a south pole at magnet $m_1$ and with a north pole at magnet $m_5$, it will be seen to provide a magnetic flux path of the nature which would be produced by a further magnet such as that shown at $m_6$. Conversely, on the opposite side of the expansion joint, flux will tend to flow in the opposite direction, as suggested by an oppositely disposed magnet $m_7$. Even if magnetization of surrounding reinforcing were very uniform, so that all of the fanciful magnets had the same coercive force and oppositely-poled magnet ends lay on opposite sides of the guidewire, as illustrated at the upper left in FIG. 3a, the magnetic circuit discontinuity at each expansion joint still tends to cause a false heading or displacement error in the field at the joint. North to south magnetic circuits will be seen to extend at 45 degrees to the guidewire direction where the guidewire crosses the joint. Furthermore, such uniform magnetic circuits do not exist in practical concrete floors, and some joint-guidewire intersections may not have opposite magnetization on two sides of the guidewire, as suggested by the joint-wire intersection where magnets $m_4$-$m_7$ converge in FIG. 3a. Furthermore, the flux around the end of each imaginary magnet varies quite non-linearly. The net effect of such magnetization of reinforcing below the guidewire is to produce unpredictable distortions in the flux above the guidewire, and in practice, to sometimes severely distort the field. Such distortions are also sometimes caused by building columns and other metal structures. In FIG. 3b lines at U' and d' illustrate how heading and displacement error voltages might vary with time in many prior art steering systems as such systems traversed a joint located along a perfectly straight guidewire. The relative magnitude of the heading and displacement disturbances depends, of course, upon how sensitive such systems are to heading. In the present invention, because each individual sensor coil is virtually unresponsive to small heading deviations, and more importantly, because the resultant voltages $e_{13}$ and $e_{46}$ form the two coil pairs are both unresponsive to heading changes even for very substantial heading angle anomalies in the guidewire field, the heading disturbances in the inductive field caused by expansion joints and the like will be seen to tend to be virtually ignored. While the displacement disturbance (d' in FIG. 3b) will suddenly increase the voltage induced in coil L1 as coils L1 and L3 encounter the joint, it will suddenly increase the voltage in coil L3 by substantially the same amount, so that the composite voltage $e_{13}$ remains substantially unaffected by the disturbance. Similar operation will occur when coils L4 and L6 pass over the joint. Since the automatic steering commands of the system are developed solely from the $e_{13}$ and $e_{46}$ composite voltages, it will now be apparent that the disturbances or anomalies at the expansion joints have minimum effects on the steering system.

In order that guidewire anomalies affect both coils of a pair equally and simultaneously, it is desirable that the two coils of a pair, i.e. L1 and L3, or L4 and L6, not be laterally spaced too far apart. It tends to be desirable that the guidewire extend roughly perpendicularly across the expansion joints along guidewire sections where high speed travel is desired to occur, but with the exemplary sensor mentioned, satisfactory operation has been achieved even where a guidewire crossed numerous expansion joints at 45 degrees. Spreading the coils of a pair laterally further apart allows the vehicle to acquire the wire more easily, from positions of greater lateral displacement and/or heading error. Putting the coils too far apart results in reduced pickup during high-speed steering, and results in differing environments for a pair of coils, so that inductive field anomalies tend to provide greater disturbances.

In the portion of a preferred system partially shown in FIG. 4, coils L1 and L3 are connected in series-opposing relationship, and preferably tuned to the guidewire signal frequency, as by means of capacitor C1 connected in parallel with coils L1 and L3, for example. The voltage $e_{13}$ is applied through coupling capacitors and input resistors to a conventional differential operational amplifier A1, which in one successful embodiment was arranged to have an overall gain of about 15. The output voltage from amplifier A1 is shown applied via coupling capacitor C2 to a filter F1 shown in block form. Filter F1 may take a variety of forms, but preferably comprises a sharply tuned bandpass filter, tuned to the guidewire signal frequency. The output signal from filter F1 is shown applied via coupling capacitor C3 to the signal input line of a conventional synchronous detector SD1, which may comprise a Type MC 1496 balanced modulator-demodulator integrated circuit, for example. Detector SD1 also receives a reference signal, derived in a manner explained below, and is operable to provide output signal pulses commensurate in magnitude with and having a polarity according to whether or not the input signal is or is not in phase with the reference signal. The output signal pulses are applied via buffer amplifier A2 and a heading angle gain-adjustment potentiometer P1 to a first order lag summer amplifier A3 which acts as a low-pass filter, providing a DC or slowly varying output signal $e_{13}$, which is proportional in magnitude to the voltage $e_{13}$ and which has a polarity commensurate with the phase relationship between $e_{13}$ and the reference signal. Coils L4 and L6 are connected in series-opposing relationship, and the voltage $e_{46}$ induced in that series combination is shown connected through substantially identical circuitry to provide a DC or slowly varying output voltage $e_{46}'$ from lag summer A6 commensurate with $e_{46}$. The signal channel used to produce the $e_{46}'$ voltage is shown identical to that used to produce the $e_{13}'$ voltage except that a potentiometer P2 applies an adjustable bias in the one signal channel rather than the multiplying or scale-change adjustment provided by P1 in the other channel. Potentiometers P1 and P2 allow small gain changes and offset errors, which might occur due to component tolerances, mechanical variations, etc., for example, to be zeroed out.

To provide the reference voltage $\phi$ applied to the synchronous detectors, the voltage $e_{25}$ across reference coils L2 and L5, which coils are connected series aiding, is applied via buffer amplifier A7 to a bi-directional clipper or limiter amplifier A8 which substantially amplifies the input signals and then clips them at the threshold level of a pair of diodes shown connected around A8, thereby providing a clipped sine wave, which approximates a square wave, at the guidewire signal frequency. The squarewave is applied to a phase-locked loop circuit PLL, which operates as a tracking filter and which may comprise a Type LM 565 integrated circuit, for example. The phase-locked loop includes a phase detector to which the clipped signal from the reference coils is applied, a voltage-controlled oscillator and an amplifier. The phase detector provides a varying DC signal commensurate with the phase relationship between the clipped signal from the reference coils. The DC signal is amplified by the amplifier and used to control the oscillator thereby driving the oscillator in phase with the clipped signal from the reference coils, but providing a clean, substantially noise-free signal for use as a reference signal by the synchronous detectors. The square wave reference output signal from the phase-locked loop has a constant amplitude over a substantial range of amplitude variation in the signals induced in the reference coils, and the phase-locked loop will provide steady output square waves even if noise causes occasional brief gaps, notches or spikes in the signals induced in the reference coils. The square wave output signal from the tracking filter is applied as the reference input to both of the synchronous detectors. The coil pairs, L1 and L3, L2 and L5, and L4 and L6 are each shown tuned to the same frequency with a respective capacitor, which has the advantages over tuning of individual coils that fewer tuned circuits need be adjusted to match and fewer parts are required.

Up through the synchronous detectors in each of the two channels the signal voltages are shown AC-coupled so that the ground or reference level is of no moment. Some of the remaining circuitry is shown using a single-polarity power supply wherein an artificial neutral or "reference" level of +7 volts is shown. It will be readily evident that the use of such a power supply arrangement is in no sense a requirement of the invention.

While the output voltage from clipper amplifier A8 has been termed a square wave, it in fact approaches a square wave only when the peak values of the sum of the voltages induced in the reference coils L2, L5 very substantially exceed the clipping levels established by the diodes connected around A8. As the truck first approaches the wire and the voltage $e_{25}$ is small, the diodes do not clip the voltage applied to A8, and an amplified sine wave from amplifier A8 is further amplified by amplifier A9, and then applied to a full-wave rectifier circuit associated with amplifier A10.

It is important that loss of the guidewire inductive field be quickly detected. For that purpose, the amplified sine wave from clipper A8 is first substantially amplified by amplifier A9 and then full-wave rectified by the rectifier circuit associated with amplifier A10, providing a positive pulse during each half-cycle of the $e_{25}$ voltage, the magnitude of each such pulse being a measure of the amplitude of the $e_{25}$ voltage. The positive pulses are low-pass filtered by filter circuits associated with amplifier A11, thereby providing a voltage from A11 which varies downwardly from the +7 volt neutral level at which amplifier A11 is biased by an amount commensurate with the magnitude of the $e_{25}$ voltage. The A11 output voltage is applied to the inverting input line of comparator amplifier A12. When the A11 output signal lies at +7 volts, such as when no appreciable voltage is induced in the reference coils, the A11 output voltage exceeds a bias voltage applied to the comparator A12 via zener diode X1, so that the comparator output voltage swings low, providing a logic 0 signal on line J, but when the reference voltage $e_{25}$ exceeds a predetermined amplitude, line J is driven upwardly, providing a logic 1 signal on line J. Positive feedback shown connected around comparator A12 results in positive or rapid switching action, introducing a predetermined amount of switching hysteresis, so that noise will not cause amplifier A12 to switch back and forth at a borderline reference signal strength condition. The logic signal on line J may be used to stop the truck, as is further discussed below.

Referring to FIG. 5, the $e_{13}'$ voltage is shown selectively connected by switch S1a or switch S2a to the inverting or non-inverting input of amplifier A13, and the $e_{46}'$ voltage is selectively connected by switch S1b or switch S2b to the non-inverting or inverting input of amplifier A13. When switches S1a, S1b are closed, a signal proportional to heading having a first polarity will be seen to be provided from amplifier A13, and when switches S2a, S2b are instead closed, a signal proportional to heading having an opposite polarity will be provided, the mentioned signals varying in either case from the +7 volt neutral level at which A13 is biased. The mentioned switches are selectively controlled in accordance with vehicle direction. Tachometer generator TG is driven by or in a direction of rotation related to that of the vehicle steerable drive wheel and provides an output having a polarity dependent upon that direction of rotation. The output voltage from the tachometer is low-pass filtered, limited and inverted to provide a pair of oppositely-acting logic signals on lines B and C to control the switches S1 and S2. The switches are illustrated for convenience as mechanical switches, and they can, of course, take a variety of different forms. It should be noted that the switching shown performed automatically by the tachometer generator is the only switching required to change the automatic steering system between forward and reverse travel modes.

Irrespective of the direction of vehicle travel, the $e_{13}'$ voltage and the $e_{46}'$ voltage are both applied to the same input of amplifier A14, shown as the non-inverting input in FIG. 5, thereby adding those two voltages, and providing an output voltage from amplifier A14 commensurate in magnitude and polarity (relative to the neutral level) with the average lateral displacement d of the sensor assembly. In order to provide a steering command signal which varies greatly with heading and very much less with displacement, one may provide substantial gain at amplifier A13 and much less gain at amplifier A14. In one successful embodiment, amplifier A13 was provided with a gain of about 7.5, while amplifier A14 had a gain of about 0.3 when the mentioned $K_2$ and $K_1$ ratio of about 150 inches per radian (or 383 cm. per radian) was used to provide very slightly over-damped operation, a damping ratio of 1.03. The absolute values of $K_1$ and $K_2$ depend, of course, upon the magnitudes and frequency of the current in the guidewire, the number of turns, diameter and vertical height of the coils above the guidewire, and upon the gains in the two signal channels up through amplifiers A3 and A6, and, as will be shown, upon the overall gain of the steering servo, or volts per degree of steering angle rotation of the steerable wheel.

The heading signal from amplifier A13 and the displacement signal from amplifier A14 are summed by applying them both to a closed-loop position servomechanism operable to position the steerable wheel to an angle commensurate with the sum of the applied heading and displacement signals. The two signals are shown applied through respective scaling resistors R54, R55 which are assumed to be equal, although they may be made to differ in order to provide a desired ratio between $K_1$ and $K_2$. Scaling resistor R40 is also assumed to be equal to R54 and R55, although that also is not necessary. The heading and displacement signals are shown applied to the non-inverting input of amplifier A15 which also receives a steering angle position feedback signal from a steering potentiometer SP via a switched-gain amplifier A16. The two input signals applied to amplifier A15 via resistors R54 and R55 together constitute the command signal for the position servo, which positions the steerable wheel SW and positions potentiometer SP until the signal applied to amplifier A15 via resistance R40 is equal in magnitude and opposite in sense (relative to the neutral level) to the command signal. In the mentioned embodiment, the voltages from amplifiers A3 and A6 each varied at about 1.0 volts per inch of lateral displacement. With the distance D between the coil pairs equal to 12 inches that amounted to about 0.209 volts per degree, and with a gain of 7.5 at amplifier A13, it will be seen that the heading voltage from amplifier A13 varied at about 1.57 volts per degree or about 89.9 volts per radian of heading error for small angles. The fixed excitation voltage applied to potentiometer SP and its amplification (during the high speed tracking mode, as will be explained below) provided an output from amplifier A16 of about 0.78 volts per degree or 40 volts per radian of turning of steerable wheel SW. The ratio between the 89.9 volts per radian output of amplifier A13 and the 40 volts per radian output from amplifier A16 indicates that the system value for $K_2$ was 2.25. With the A3 and A6 voltages each varying at 1.0 volt per inch, and with a gain of 0.3 provided in amplifier A14, its output varied at 0.6 volts per inch, which, when compared to the output from amplifier A16 indicates that the system value for $K_1$ was 0.015. Equation (5b) indicates that $K_1$ and $K_2$ values of 0.015 and 2.25 with a wheelbase B of 80 inches provides a damping ratio of 1.03.

Increasing the value of resistor R40 or decreasing the gain of amplifier A16 will result in greater wheel rotation for a given change in command signal, thereby decreasing both $K_1$ and $K_2$ in the same proportions but not affecting their ratio. The gain of amplifier A13 (and/or A14) could be decreased or increased by a given factor if the resistance of scaling resistor R54 (and/or R55) were decreased or increased by the same factor without materially affecting system operation, as will be apparent to those skilled in the art.

The exemplary system shown in detail was intended for use on a truck which was manually steered up to the guidewire by conventional manual steering apparatus not shown, and then automatically steered when the truck was aligned sufficiently well over the guidewire. In order that the operator not be required to manually steer the truck into an extremely precise position over the guidewire before automatic steering commences, automatic steering was arranged to commence at greater heading and lateral displacement deviations than those deemed allowable during automatic steering at high speeds, and to provide the greater steering angles desirable to automatically align the truck over the guidewire from those greater deviations, the rotation of the steerable wheel per volt of command signal is varied between the acquisition mode and the high-speed steering mode. During the acquisition mode, a logic 1 signal ($+14$ volts) on line D cuts off conduction of transistors Q5 and Q6, so that the end of input resistor R24 floats, and amplifier A16 is connected as a unity-gain voltage follower, so that a given turning of the steerable wheel and adjustment of potentiometer SP cause a given change in the voltage applied via resistor R40, a value of the order of 3.64 volts per radian having been used in the mentioned exemplary embodiment. When the vehicle is sufficiently near the guidewire to be automatically steered, a low logic signal on line D turns on transistor Q5 which turns on transistor Q6, thereby connecting the inverting input line of amplifier A16 to the neutral level and providing substantial gain in amplifier A16, so that a given change in steering angle causes a much greater change in the feedback voltage applied via resistor R40, such as the 40 volts per radian value previously mentioned. When the heading and displacement errors are zero, and the steering wheel angle is zero, amplifiers A13 and A14 each apply the neutral level voltage to the inverting input line of amplifier A15, amplifier A16 applies a neutral level signal to the same input line, and the neutral level signal is applied to the non-inverting input of A15. This causes amplifier A15 to drive transistors Q1 and Q2 so that their common emitter terminal 51 lies at the $+7$ neutral level, with both transistors conducting on about the midpoints of the linear portions of their characteristic curves. Resistors R17 and R18 are all equal, so amplifier A17 will be seen to drive the emitter terminals 52 of transistors Q3 and Q4 to the neutral level, and so that these transistors are also conducting at about their midpoints. The emitter terminals 51, 52 of the two pairs of transistors are connected through small current-limiting resistances and a pair of $K_1$ relay contacts to the operating coils of a servo-valve SV, and under the balanced conditions assumed wherein terminals S1 and S2 lie at the same voltage, it will be apparent that no current will flow through the operating coils of the servo-valve, the servo-valve will remain centered, and hydraulic ram SM will not move steerable wheel SW from its centered position. Upon a deviation in the positive direction from the neutral level of any of the three input signals applied to the inverting input of summing amplifier A15, the decrease in the A15 output voltage lowers the voltage at terminal 51 to a value below the neutral level, and amplifier A17 raises the voltage at terminal 52 above the neutral level, thereby causing current flow upwardly (as viewed in FIG. 5) through the servo-valve operating coils, actuation of steering motor SM and movement of steering potentiometer SP downwardly as viewed in FIG. 5 until the balanced condition is restored at summing amplifier A15. The converse operation which occurs upon a decrease in one or more of the three summed signal inputs will be apparent without detailed explanation.

In the mentioned exemplary embodiment, the gain of amplifier A16 was increased (and the $K_1$ and $K_2$ values thereby each decreased) by a factor of about 11 for high-speed steering over that value utilized for acquisition, although other values may be preferred in various applications of the invention. In applications of the invention where a vehicle is to be guided automatically not only during slow or high-speed travel down a substantially straight guidewire, but also so as to make substantial turns, such as at the end of an aisle, as suggested by the guidewire in FIG. 3, one need merely switch the D logic signal when the vehicle approaches a guidewire section having a predetermined minimum radius of curvature, as well as insuring that vehicle speed does not exceed a desired value, of course. It will be apparent that such switching may be accomplished in a variety of different ways, by means of floor-embedded magnets which operate vehicle-carried magnetic reed switches, for example, or by means of various mechanical or photoelectric vehicle location sensors.

Varying the gain of amplifier A16 between the high-speed straight travel mode and the low-speed sharp turning mode can be seen to amount to varying both $K_1$ and $K_2$ by the same factor in equation (3). Because the vehicle natural frequency automatically becomes very low at the low vehicle speeds at which sharp turns must be made with most material-transporting vehicles, steering stability presents no appreciable problem, and, if desired, a substantially different ratio between $K_1$ and $K_2$ may be used during the low-speed turning mode than that given by equation (5) and used for high-speed straightline steering, although use of the same ratio is entirely satisfactory for many applications.

While a hydraulic position servo is shown used to steer the steerable wheel SW, that is in no sense a requirement of the invention, as an electric motor servo can instead be used. Indeed, the invention is not restricted to use on vehicles having steerable wheels and can be used, for example, on vehicles wherein steering is accomplished by control of the relative speeds of two drive wheels, as is shown below. It should be noted that no lead, lead-lag, tachometer feedback or other gain shaping or compensation circuits are shown associated with the servo shown in FIG. 5, nor were any deemed necessary in the mentioned exemplary embodiment. Such compensation can be added, however, without departing from the invention, if deemed necessary or desirable in particular applications of the invention. While shown arranged to position a single steerable wheel, the actuator of the steering servo could just as well position two laterally spaced apart steerable wheels using any of many well-known steering linkages. During high-speed travel two laterally spaced apart steerable wheels could even be positioned by two separate motors receiving the same command signal, since proper steering angles for the two wheels do not significantly differ, both such angles being small, during high speed travel. While the central longitudinal or x axis of the sensor assembly has been shown extending midway between the non-dirigible wheels of the vehicle and such a location is preferred, the sensor can be laterally nearer one such wheel than the other without materially affecting steering at high speeds with small steering angles. An off-center positioning of the sensor may create wheel scrubbing during sharp turning at low speeds, however. The central or x axis of the sensor should extend approximately perpendicularly to the axes of the non-dirigible wheels. In the disclosed exemplary embodiment of the invention, small errors which might occur by misalignment in that respect may be zeroed out by adjustment of potentiometers P1 and P2.

Figure 6A:
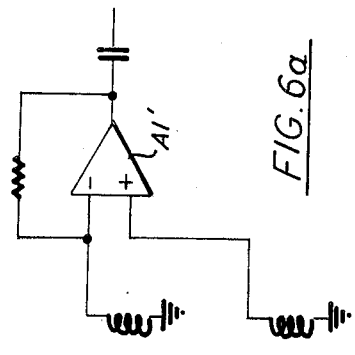
FIGS. 6a and 6b are schematic diagrams illustrating two possible modifications which may be made in the circuit of FIG. 4.
Figure 6B:
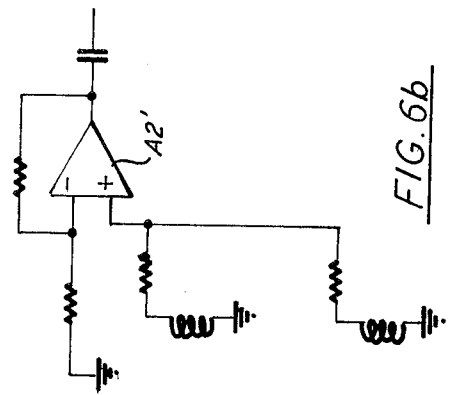

It is in no sense necessary that the sensor coils be connected in series in order to differentially or cumulatively combine their output voltages, as is illustrated in FIGS. 6 and 6b. In FIG. 6a a pair of coil voltages are shown applied to opposite input terminals of an operational amplifier A1'. Such an arrangement may combine the two coil voltages either differentially or cumulatively, depending upon how the two coils are poled. FIG. 6b shows an arrangement wherein the outputs of two coils are combined at the same input terminal of an operational amplifier, and again, whether the coil voltages are added or subtracted depends upon the relative connections of the coil terminals.

A variety of prior art guidance systems include means for halting vehicle operation if the vehicle departs too extensively from the guidewire. In accordance with a further concept of the present invention, a principle of progressive degradation is used, so that deviations of heading and lateral displacement within certain ranges do not result in stopping of the vehicle, but merely limiting its speed to a predetermined value, while deviations outside further ranges result in stopping. It is a feature of the invention that the limits of those ranges can be specified independently in terms of heading or lateral displacement rather than some composite function of both, so that such limits need bear no fixed relation to the heading to displacement sensitivity ratio used for steering.

In the exemplary logic circuit shown in FIG. 8 the heading and displacement signals from amplifiers A13 and A14 (FIG. 5) are each applied to a pair of "window" comparators, or bi-directional comparators, of the group WC1 to WC4. Each of the four comparators is connected to receive a respective fixed bias signal and arranged to switch whenever the heading or displacement signal which it receives exceeds the magnitude of the bias singal in either direction. Thus comparator WC1 may provide a logic 0 output signal whenever vehicle lateral displacement error is less than ±1.5 inches (3.81 cm.), for example, but a logic 1 signal if either of those limits is exceeded, WC2 may provide a logic 0 output signal if the lateral displacement error is less than ±3.0 inches (7.62, cm.), for example, but a logic 1 signal if either of those limits is exceeded, while comparators WC3 and WC4 operate similarly but are biased to switch at different values, such as ±1.5 degrees for WC3 and ±3 degrees for WC4. It should be recognized that the inch limits need not numerically correspond to the degree limits, although the mentioned values were successfully employed in the mentioned exemplary embodiment. Each comparator is also shown connected to receive the logic signal on line J through a respective diode, so that each comparator will provide a logic 1 signal upon loss of sufficiently strong sensor signals. Each of a group of relay drivers shown in FIG. 8 is assumed to be operated by receipt of a low or logic 0 signal. For safety's sake the contacts of a "Slow" relay SLO and a "Stop" ST relay are each wired, in a manner not shown in FIG. 8, and those two relays are advantageously operated, in a fail-safe manner, i.e. they will slow down or stop the vehicle if their operating coils or circuits supplying signals to those coils were to become open.

During manual steering of the vehicle, an operator's "Auto-Manual" switch AM is opposite to the position shown, so that logic 1 from inverter I1 conditionally enables NAND gate G4 and G5, the latter through OR gate G6. If vehicle heading and/or lateral displacement exceed either of the 3 degree or 3 inch limits, a logic 1 signal from OR gate G2 is inverted by inverter I2, providing logic 1 from G4, logic 0 from G5, and logic 1 from inverter I3, disabling a relay driver connected to an alarm AL, but when the operator steers the truck to within those outer limits with switch AM in the manual position, a logic 0 output from G2 causes alarm AL to be sounded, advising the operator that switching to automatic steering can take place. If the operator throws the switch to the automatic position in an attempt to commence automatic steering while the truck is outside any of the 3 degree or 3 inch limits, a logic 1 signal from gate G2 and a logic 0 signal from inverter I1 cause alarm AL to be sounded.

During manual steering, the logic 1 signal from inverter I1 passes through OR gate G7 to disable a relay driver connected to an "On Guide" lamp OGL, the low signal from switch AM disables gate G8 so that a low output from inverter I4 operates a "Stop" relay ST which is connected to stop the vehicle if it is not operated, the low output from switch AM disables gates G9 and G10, operating "Slow" relay SLO, which is connected to limit vehicle speed if it is not operated, and disabling servo-valve relay K1, preventing operation of the steering servo, the contacts of relay K1 being shown in FIG. 5. Even though an operator attempt to begin automatic steering when the truck is outside a 3 degree or 3 inch limit will sound alarm AL as previously described, it advantageously will not stop the truck since a logic 1 signal from a cleared latch FF will cause gate G3 to maintain gate G8 disabled.

If, after the vehicle has been manually steered to within the 3 degree and 3 inch outer limits, the operator moves switch AM to the automatic position, the logic 1 signal from switch AM will enable gate G10, operating servo-valve relay K1 so that automatic steering will commence, unless a logic 0 signal should occur on line J due to insufficient signal pickup by the sensor assembly, as was explained, in connection with FIG. 4. The comparator A12 in FIG. 4 arranged to provide a logic 1 signal on line J when the vehicle is somewhat outside the 3 inch (7.62 cm.) and 3 degree limits during normal operation with sufficient current in the guidewire. If the vehicle is inside the 3 degree and 3 inch limits but outside a 1.5 inch (3.81 cm.) or 1.5 degree limit when switch AM is first switched to the automatic position, the logic 1 signal from gate G1 prevents the logic 1 signal of switch AM from setting latch FF. The logic 1 signal from switch AM also conditionally enables gate G9, and if vehicle deviations exceed the 1.5 degree or 1.5 inch limits, a logic 1 signal from OR gate G1 then enables gate G9, disabling relay SLO so that vehicle speed is limited, and vehicle speed will remain limited, of course, until deviations fall within the 1.5 degree and 1.5 inch limits. Prior to automatic steering within the 1.5 degree and 1.5 inch limits, the logic 1 from switch AM and a logic 1 signal from gate G3 conditionally enable gate G8, but unless the vehicle strays beyond the 3 degree and 3 inch limits, a low or logic 0 output from OR gate G2 disables gate G8 maintaining relay ST operated so that vehicle travel continues at the limited speed. During automatic steering a low logic signal occurs from inverter I1, and if the vehicle is within the 3 degree and 3 inch limits so that the gate G2 output is low, the "on Guide" lamp OGL is illuminated, indicating to the operator that automatic steering is occuring. The low signal from inverter I1 causes gate G4 to conditionally enable gate G5. If the vehicle strays outside one of the 3 degree or 3 inch limits, the logic 1 signal from gate G2, inverted by inverter I2 and passed through OR gate G6 then disables gate G5, thereby to sound alarm AL and warn the operator. The Slow relay SLO may be connected to control the vehicle drive motor (or motors) in a variety of different ways, such as to limit the pulse frequency or width in many thyristor motor control circuits, for example. In different applications such a relay may be used to limit motor torque to a particular value, or instead to limit motor speed directly.

With automatic steering occurring inside the 3 degree and 3 inch limits, as the truck first steers within the 1.5 degree and 1.5 inch limits, the lowering of the gate G1 output allows latch FF to set, signalling a complete acquisition of the guidewire. The lowering of output line D of the latch then decreases the gain of the signal from the steering servo feedback potentiometer in the manner described above in connection with FIG. 5 to allow close tracking of the wire and the lowering of the gate G1 output simultaneously operates relay SLO, allowing the vehicle to travel at maximum speed. Thereafter, if the vehicle should then stray outside a 1.5 degree or 1.5 inch limit with latch FF set, the raising of the gate G1 output is unable to clear the latch, so the steering servo will continue to operate in its close-tracking mode, but relay SLO will be de-energized to limit vehicle speed. If the vehicle were then to stray outside a 3 degree or 3 inch limit, however, a logic 1 signal from gate G2 will enable gate G8 to de-energize relay ST and stop the vehicle.

While comparators WC1 and WC2 have been shown direct-coupled to receive the displacement signal, it should be recognized that either or both of those comparators could also receive a rate of change of displacement signal component, by connecting a "lead" capacitor in parallel with the conventional scaling resistors (not shown) which apply the displacement signal to those comparators, for example. Similarly, lead circuits could be used if desired at the inputs to comparators WC3 and WC4. A comparator circuit illustrating such a technique is shown in FIG. 8a. Such use of lead circuits tends to effectively narrow the limits for a given deviation if that deviation is increasing rapidly, which tends to help anticipate a dangerous condition. While a single intermediate pair of limits have been shown established for heading and displacement, it will be apparent now that several such pairs of limits could be readily established by merely duplicating comparator circuits or arranging comparator circuits to switch their own inputs as particular ranges are exceeded. While computation of separate heading and displacement error signals advantageously allows deviation limits to be set independently of each other, it should be noted that limits can be easily established as composite functions of heading and displacement if so desired, using a mix of heading and displacement components which may differ as much as desired from that used for steering the steerable wheel. For example, it will be readily apparent that comparators WC1 and WC2 could be arranged to also receive a heading input signal from amplifier A13, if desired, and that comparators WC3 and WC4 could be arranged to also receive a displacement signal from amplifier A14, if desired.

Though synchronous detection has been shown employed in the specific exemplary embodiment which has been described and the use of such detection tends to provide a measure of noise immunity which is desirable in many applications, the use of synchronous or phase detection is not strictly necessary; and thus in some embodiments of the invention the reference coils, synchronous detectors and tracking filter used in the exemplary embodiment can be eliminated. In FIG. 7 the voltages from coils L1, L3, L4 and L6 are each shown amplified and rectified to provide slowly-varying DC voltages, $e_1'$, $e_3'$, $e_4'$ and $e_6'$, all of which will be assumed to have the same polarity. FIG. 7 shows a grounded neutral system for sake of simplicity. The coils are shown direct-coupled to individual amplifiers but they can be AC-coupled instead. The output of each amplifier is preferably AC-coupled to a respective rectifier, so that amplifier offset or drift will not affect the voltages developed by the rectifiers. The rectifiers RT1, RT3, RT4 and RT6 shown as simple blocks preferably comprise simple diode full-wave rectifiers, although half-wave rectification may be used. The rectifier outputs may be individually low-pass filtered, but in FIG. 7 pairs of the voltages are shown filtered as they are combined in a pair of lag summer amplifiers A21 and A22. When coils L1 and L3 are equidistant from the guidewire on opposite sides of the guidewire, voltages $e_1'$ and $e_3'$ will be equal in magnitude, thereby providing a zero output from amplifier A21, but if a heading or displacement error puts coil L3 nearer to the wire than coil L1, amplifier A21 will provide a positive output which is directly comparable to the voltage $e_{13}'$ mentioned in connection with FIG. 4, being commensurate in magnitude and sign with the distance $y_a$ in FIG. 2g. In similar fashion the rectified outputs from coils L4 and L6 are shown combined to provide a voltage $e_{46}'$ comparable to that shown in FIG. 4, i.e., a voltage commensurate with the distance $y_b$ in FIG. 26. The outputs from amplifiers A21 and A22 are shown combined by amplifiers A13' and A14' to provide head- and displacement voltages of substantially the same nature as those derived by the circuit of FIGS. 4 and 5. The switching used in FIG. 5 to reverse the heading signal polarity has been omitted from FIG. 7 for sake of simplicity, but it may be used, of course, with systems intended for both forward and reverse travel. The heading and displacement voltages may be combined in the same manner as that shown in FIG. 5 in order to provide a command signal to drive a steering position servo, or a command signal to control steering by differential speed control, and to control logic circuits of the nature of FIG. 8. Whether derived by phase detection or amplitude detection the varying DC voltage derived from each coil pair L1, L3 or L4, L6 has an "S" characteristic of the nature shown for voltage $e_{13}$ in FIG. 2f, with two inflection points occurring at the two lateral displacement limits where one coil or the other of a pair is centered over the guidewire, and automatic steering at high speed is arranged to occur only when the lateral displacements of the two coil pairs are each in between those two inflection points. If both coils of a pair lie on one side of the guidewire, the coil of the pair lying nearer the guidewire could have a voltage induced in it of the same amplitude as that expected when the vehicle was centered over the guidewire, but the other coil of the pair then would have a very low voltage induced in it. Thus one can be sure that the guidewire lies laterally in between the coils of a pair if the voltages induced in both coils of the pair exceed a predetermined amplitude. In FIG. 7 the voltages from the four rectifiers are shown each applied through a respective threshold detector to a coincidence circuit shown as a NAND gate G47, so that the gate is enabled only when voltages exceeding a prescribed magnitude are induced in all four coils. The logic signal on line J' (or its inverse) may be used for control in generally the same manner as the signal on line J in FIGS. 4 and 8. While threshold detection is shown simply provided by the forward characteristics of four diodes, more elaborate forms of threshold detection may be used, or course. The filtering capacitors shown associated with the diodes are unnecessary, of course, if adequate low-pass filtering is used with the rectifier circuits.

In some applications of the invention, the threshold-detected rectifier outputs will be applied to separate coincidence circuits in pairs, as in FIG. 7a, to provide separate logic signals each representing whether or not the guidewire lies laterally between a respective coil pair, such as signals $J_f$ and $J_r$ in FIG. 7a, as well as a combined signal J. A vehicle may be driven toward a guidewire until a logic 1 occurs only on line $J_f$, for example, indicating that coils L1 and L3 lie on opposite sides of the guidewire, but that coils L4 and L6 both lie on the same side of the guidewire. Then, although the voltages $e_{46'}$ and those from amplifiers A13' and A14' will not be accurate measurements of the distance $y_b$, heading and lateral displacement in terms of magnitude, they will be correct in terms of their signs or polarities, and can be used to steer the vehicle in the proper direction to align it with and over the guidewire, and when either coil L4 or L6 has crossed the wire shortly thereafter, automatic steering at high vehicle speeds can commence. Thus a logic zero on either line $J_f$ or $J_r$ can be used to limit vehicle speed, and/or to control a steering servo scale factor, in the manner in which the signal on line D switches the gain of amplifier A16 in FIG. 5, for example.

While FIGS. 4 and 7 illustrate initial combination of coil voltages from coil pairs spaced apart on the same lateral axis, and then combination of the two resultant voltages desired in order to produce heading and displacement signals, that particular sequence is by no means essential to the invention. Ignoring the point in the system where phase or amplitude detection takes place, i.e. whether signals are AC or DC, one can characterize heading and displacement as being computed by the two following expressions:

$$\psi \approx (e_3 - e_1 - e_6 + e_4 / D)$$

$$d \approx (e_3 - e_1 + e_6 - e_4 / 2)$$

wherein $e_1$, $e_3$, $e_4$ and $e_6$ are the magnitudes of the voltages induced in the coils L1, L3, L4 and L6. Voltages from pairs of coils on the same lateral side of the sensor assembly can be initially combined and then the two resultant voltages combined to compute heading and lateral displacement, or diagonally spaced coil pair voltages on the sensor can be initially combined and the two resultant voltages used for computation, or all four of the coil voltages may be initially combined. FIG. 7b illustrates one form of the last-suggested arrangement. Any coil input signal in FIG. 7b can be connected to an opposite polarity amplifier input terminal from where shown if the terminals of the coil are interchanged, of course. In FIG. 7b the detectors DET can comprise amplitude detectors (rectifiers), or can be synchronous detectors if a phase reference is supplied, such as an additional coil like coil L2 or coil L5 in FIG. 4. In FIG. 7c two pairs of coil voltages are differentially combined and then amplified, rectified and combined with the other pair at separate amplifiers. It is important to note that in FIG. 7b since all of the coil voltages are applied through individual scaling resistors, there is no requirement that any coil have the same number of turns as any other coil, nor in FIG. 7c need coils L1 and L3, which should be similar to each other, have the same number of turns as coils L4 and L6, though in most embodiments of the invention all of the coils will ordinarily be substantially identical for sake of production and stocking economies. In FIG. 7d yet another arrangement is shown wherein eight coils are shown. Each pair of coils having similar numerical designations but differing suffix letters, such as L1a and L1b, for example, is arranged to occupy substantially the same position, being bi-filar wound, for example, and the four pairs are spaced apart in a preferably rectangular array as in FIG. 2a. It is not strictly necessary that such coil pairs be electrically separate coils, and they may be separate halves of a center-tapped or otherwise tapped coil.

In various embodiments of the invention, a signal derived from combining the voltages induced in any pair of coils which lie substantially on the same lateral axis, or a voltage derived one or more centered coils (such as L2 and L5 in FIG. 4) may be rectified and filtered and used as an automatic gain control signal, using a voltage-controlled variable-gain amplifier. In FIG. 7e the net voltage from coils L1 and L3 is shown applied through a summing amplifier SA, rectified by a diode and amplified and filtered to provide a gain control voltage for amplifier VGA on line AGC. As is known in the art, the use of such automatic gain control serves to linearize the variation of the output voltage from amplifier VGA with lateral displacement. Similar gain control can be used, of course, to linearize the net voltage $e_{46}$ in similar fashion. Where pairs of coil voltages are scaled as they are combined it is not strictly necessary that the coils provide the same voltage per amount of lateral displacement, and hence not strictly necessary that the coils of a pair be located equal lateral distances from the sensor x axis, particularly if automatic gain control is used to linearize coil outputs. If the coil outputs are quite non-linear over the desired operating range, non-linear or variable scaling would tend to be required to provide symmetrical operation. To avoid such a requirement, two coils lying on the same lateral axis (e.g. L1 and L3) ordinarily will be identical and spaced equal distances from the sensor x axis, and coils L4 and L6 will be identical and spaced equal distances from the x axis, but there is no requirement that coils L4 and L6 have the same spacing as coils L1 and L3, although it is contemplated that they will in most embodiments of the invention.

In FIG. 9 the vehicle diagrammatically shown includes a pair of drive wheels 11', 12' mounted distance F laterally apart on opposite sides of a vehicle, with opposite ends of the vehicle supported by means of non-driven caster wheels CW, CW. Each of the drive wheels is driven by a separate motor M1 or M2, (ordinarily through reduction gearing, not shown), and steering is accomplished by differential speed control of the two motors. The vehicle is shown arranged at a heading angle $\psi$ and a lateral displacement d from a guidewire W. It is well known that the rate of change $\omega$ of heading angle $\psi$ can be related as follows to the wheel speeds $V_1$ and $V_2$:

$$\omega = \frac{V_1 - V_2}{F} \qquad \mu = \frac{V_1 - V_2}{Fp}$$

and the average speed V of the vehicle can be stated as $V = (V_1 + V_2)/2$.

The lateral component y of vehicle velocity equals V sin $\psi$, and making the small-angle approximation that sin $\psi = \psi$ in radians, one can state that for lateral displacement d that $d = (V\psi/p)$.

If one assumes provision of a control system which will force the difference in drive wheel speeds to accurately correspond to lateral displacement and heading errors according to two coefficients or scale factors $K_1$ and $K_2$, one can write: $V_1 - V_2 = -K_1 d - K_2 \psi$.

By solving the last several equations simultaneously to eliminate $\psi$, d, $V_1$ and $V_2$, one obtains the following characteristic equation:

$$p^2 + \frac{K_2}{F} p + \frac{K_1 V}{F} = 0 \quad 2\zeta\omega_n = \frac{K_2}{F} \text{ and } \omega_n^2 = \frac{K_1 V}{F},$$

from which one can find that the damping ratio is: $\zeta = (K_2/2\sqrt{K_1 V \quad F}$ and the natural frequency $\omega_n = \sqrt{K_1 V/F}$).

Thus unlike the prior system using a steerable wheel, the damping factor does vary inversely, with the square root of vehicle speed V, and to provide critical damping, for example, over the entire speed range of the vehicle, the relationship between heading sensitivity and displacement sensitivity should vary in accordance with $(K_2^2/K_1) = 4 \, VF$. In the expressions involving the vehicle of FIG. 9, one should note that the $K_1$ and $K_2$ terms represent the amount of drive wheel speed difference provided per length unit of lateral displacement or per angle unit of heading error rather than representing steerable wheel angle change for such quantities.

If fixed values are selected for $K_1$ and $K_2$ in such a system, the damping factor will tend to provide undesirably slow response at very low vehicle speeds assuming that a damping factor approaching critical damping is provided near the maximum speed of the vehicle. However, the $K_1$, $K_2$ relationship may be altered, if desired, for travel at low speeds.

It is important to note that the characteristic equation developed above for guidance with differential speed steering is based on an assumption that the relative speeds of the two drive motors can be controlled sufficiently rapidly (compared to the natural frequency $\omega_n$ of the vehicle) that the difference between the two motor speeds responds to changes in the command signal without an appreciable time lag. This tends to be a somewhat rougher approximation than that previously made respecting servo response for a steering servo, since the inertia loads seen by the two drive motors and dependent upon the load carried by the vehicle tend to limit the rapidity of speed control, even at high vehicle speeds. However, the vehicle natural frequency increases less with vehicle speed in the case of differential speed control, increasing only as the square root of vehicle speed rather than in direct proportion to vehicle speed. Thus I contemplate that the motor speed control systems should have a frequency response of 2 to 10 times $\sqrt{K_1 V_m}$, where $V_m$ is the maximum contemplated speed for the vehicle, when the vehicle is carrying a maximum inertia load. While FIG. 9 illustrates a vehicle having its drive wheels located about midway between opposite ends of the vehicle, one should note that the analysis given above applies irrespective of that location, and woud apply even if either end of the truck were cut off, at line j or at line k, for example.

In FIG. 10a command signal $e_c$ assumed to be developed in either the manner shown in FIGS. 4 and 5 or in FIG. 7 by summing heading and displacement voltages in a selected proportion is shown applied to vary the speed of motors M1 and M2 in opposite senses from a base or average speed determined by voltage $e_b$ applied to both motor speed control systems. Each motor speed control system is shown including a respective summing amplifier which receives the average speed command signal $e_b$, one polarity or the other of the steering command signal $e_c$, and a feedback voltage from a respective tachometer generator TG1 or TG2 driven by a respective motor, and provides a respective speed error signal $e_{s1}$ or $e_{s2}$ to control a respective motor speed control circuit MC1 or MC2, to vary the torque and hence the speed of the motor. The circuits MC1 and MC2 may take a variety of forms, such as thyristor pulse frequency and/or width modulation circuits, for example, or power transistor circuits. The average speed is shown being sensed by summing the ouput voltages of the two tachometers to switch a comparator and operate relay KS when vehicle speed exceeds a predetermined value, though increase of voltage $e_b$ above a given value could be used instead for such a purpose in many applications. The operation of relay KS will be seen to apply the computed heading and displacement voltages in a different ratio than when the relay is not operated, thereby allowing damping ratios approximating a desired value, such as critical damping, to be obtained both at very high and very low speeds. It will be apparent that several further relays and sets of switches (not shown) could be similarly arranged to switch at selected vehicle speeds so as to selectively use three or more $K_1$, $K_2$ ratios over the entire speed range of the vehicle.

While FIG. 10a illustrates a form of differential speed control wherein steering commands do not vary the average speed of the vehicle, the invention is applicable as well with other forms of differential speed control, such as where a given command voltage accelerates or decelerates one motor without changing the speed of the other, or where a given command voltage accelerates or decelerates one motor to a lesser extent than it decelerates or accelerates the other motor. In FIG. 10b if one assumes that positive inputs to each of the two speed control systems shown increase the motor speeds, a steering error can be seen to accelerate one motor without changing the other from its base speed, while if one instead assumes that positive inputs decrease motor speeds or if one reverses the diodes X1 and X2, a steering error will decelerate one motor without changing the other from its base speed. If one closes the two switches shown in FIG. 10b, a steering error will accelerate or decelerate one motor to a lesser extent than it decelerates or accelerates the other. In FIG. 10c the lateral displacement portion of the command signal is assumed to be applied to the input amplifier as in FIG. 10a, but the heading signal is applied via a variable-gain amplifier VA, the gain of which is varied roughly proportionally to the square root of vehicle speed, by an output voltage from a simple biased-diode function generator DFG shown connected to receive a voltage V commensurate with the average of the two drive wheel speeds. The latter voltage can be obtained in the manner shown in FIG. 10a, or the voltage $e_b$ in FIG. 10a used in lieu thereof. With such an arrangement, a substantially constant damping ratio can be provided.

While FIG. 1a assumed the sensor assembly to be mounted essentially at the axis $y_1$ of the non-steered wheels, and while that position is deemed ideal for many applications and was used in the specific embodiment illustrated in FIGS. 4 and 5, in some other applications it may be deemed desirable to mount the sensor assembly an appreciable longitudinal distance c forwardly or rearwardly from the axis $y_1$ of the non-dirigible wheels as suggested by box S' in FIG. 1a, and that the system illustrated is versatile enough to allow sensor placement at numerous different positions on the vehicle is a further important feature of the invention. Distance c is measured to the longitudinal midpoint of the sensor assembly. A more rigorous treatment would measure to the individual coils, but the error is very small if the longitudinal dimension D of the sensor assembly is small compared to wheelbase B. In FIG. 1a, if the sensor is mounted on the forward side of axis $y_1$ away from the steerable wheel, distance c will be deemed negative. Equation (1) specifying heading still remains the same, but lateral displacement d of the sensor then includes an added component of -c sin ψ due to heading, so that equation (2) should be modified to the form:

$$d = (V\psi/p) - c\psi \quad (2a)$$

Solving equations (1), (2a) and (3) simultaneously to eliminate $\theta$ one obtains a modified characteristic equation:

$$p^2 + \frac{(K_2 - K_1 c)Vp}{B} + \frac{K_1 V^2}{B} = 0 \quad (4c)$$

from which one can determine that the natural frequency is the same as that given by equation (5a), i.e. that moving the sensor longitudinally does no affect the system natural frequency, but that the damping ratio is now given by:

$$\zeta = \frac{K_2 - K_1 c}{2\sqrt{K_1 B}} \quad (5c)$$

i.e. that moving the sensor longitudinally rearwardly or forwardly from the drive wheel axis decreases or increases the damping factor by the amount:

$$\frac{c}{2}\sqrt{\frac{K_1}{B}}$$

Figure 1B:
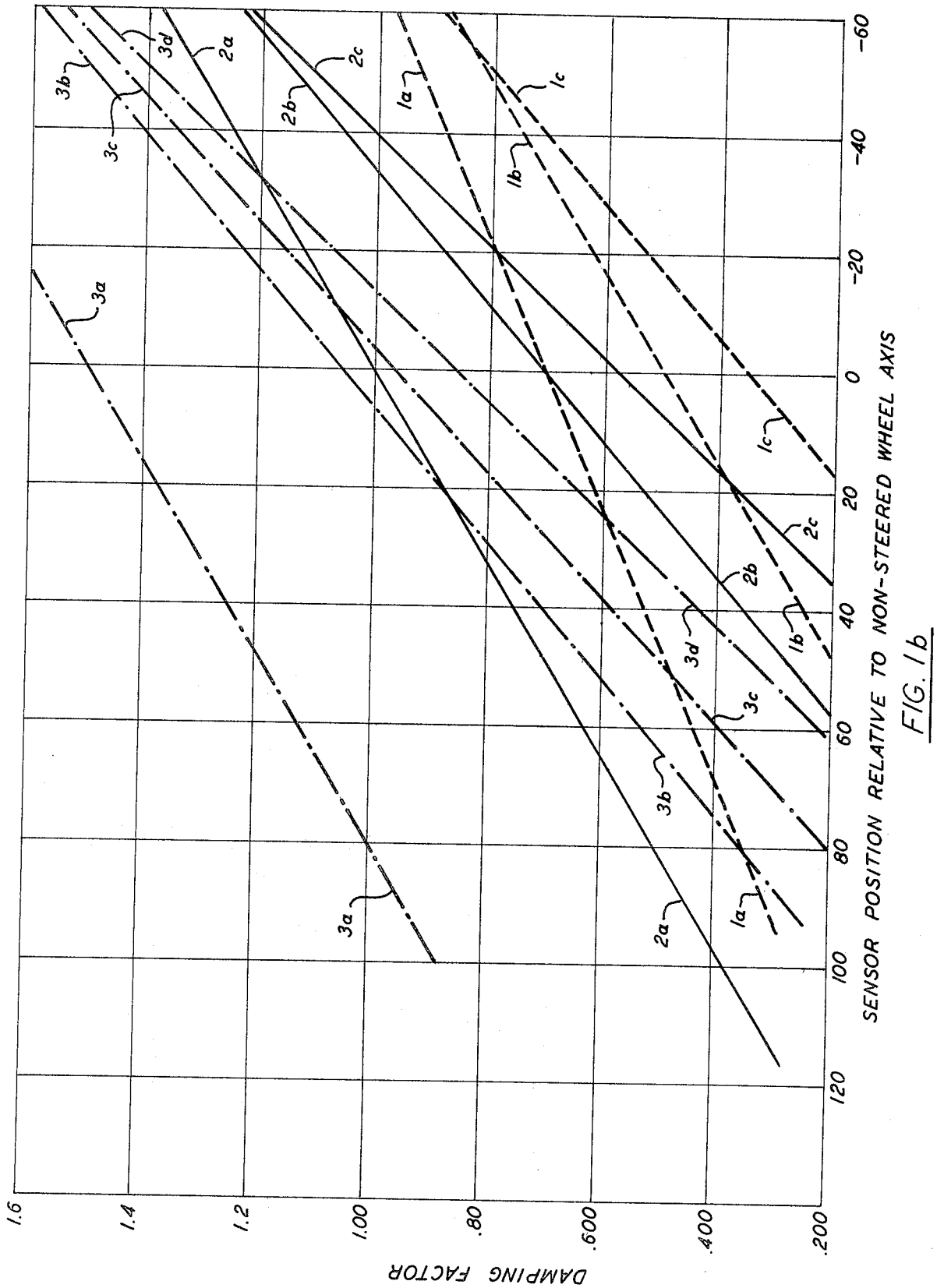

In the graph of FIG. 1b which pertains to a vehicle having an 80-inch (203 cm.) wheelbase B, values plotted to the left of the zero abscissa value represent placement of the sensor assembly back toward the steerable wheel, an abscissa value of 80 representing sensor placement at the longitudinal location of the steerable wheel, and values in excess of 80 representing sensor placement behind the steerable wheel, while the negative abscissa values relate to placement of the sensor forward from the axis of the non-dirigible wheels. Each of the curves (actually straigt lines) shown is a plot computed from equation (5c) of damping factor for a particular set of $K_1$ and $K_2$ values. Because each curve slopes downwardly to the left, it is apparent that the damping factor decreases in general as the sensor is moved rearwardly and increases as that assembly is moved forwardly, a general result which those skilled in the art of wire-guided vehicles would tend to expect.

Three curves labelled 2a, 2b and 2c represent damping factor variation with $K_2$ equal to 2.0 radians per radian and $K_1$ values of 0.0125, 0.025, and 0.0375, respectively, measured in radians per inch. From comparison of those curves it becomes apparent that decreasing the ratio of $K_2$ to $K_1$ causes the damping factor to vary more steeply with the longitudinal position of the sensor. If the sensor is moved rearwardly too far, instability (diverging oscillation) will result. The damping factor will become negative, for example, for the conditions of curve 2c when the distance c exceeds a value of 53.3 inches (135.4 cm.). In the case of curve 2b, the damping factor becomes zero when the sensor is located at the longitudinal position of the steerable wheel, i.e. when c equals 80 inches, the wheelbase of the vehicle. From equation (5c) it becomes evident that the damping factor decreases to zero and then becomes negative when c equals and then exceeds ($K_2/K_1$).

Three dashed line curves labelled 1a, 1b and 1c represent damping factor variation with $K_2$ equal to 1.0, with $K_1$ values of 0.00625, 0.0125 and 0.0250, respectively, and four dot-dash curves labelled 3a, 3b, 3c and 3d represent damping factor variation with $K_2$ equal to 3.0, with $K_1$ values of 0.0125, 0.025, 0.030 and 0.0375, respectively. From comparison of various curves in FIG. 1a, the effects of sensor longitudinal placement can be readily appreciated. It was stated above with respect to a vehicle having the sensor located substantially at the axis of the non-steered wheels, that the ratio of ($K_2^2/K_1$) ordinarily will lie within the range B to 9B to provide a damping factor in the range of 0.5 to 1.5. Using equation (5c), it now may be more generally stated that the relationship between $K_2$ and $K_1$ should lie between:

$$K_2 = \sqrt{K_1 B} + K_1 c \text{ and} \quad (\zeta = 0.5)$$

$$K_2 = 3\sqrt{K_1 B} + K_1 c \quad (\zeta = 1.5)$$

Since one can provide desired values of $K_1$ and $K_2$ by merely selecting scaling resistor sizes or amplifier gains, it will be apparent that one can easily pro a desired damping factor with the sensor located at any one of numerous longitudinal locations.

If one substitutes negative values for V into the system characteristic equation (4b) developed above, solutions of that equation then provide positive roots, indicating clear instability. However, if one also reverses the effect of heading ψ in the command equation (3) and then re-solves equations (1), (2) and (3) simultaneously, one can write a modified characteristic equation for reverse travel:

$$p^2 - \frac{K_2 V}{B} p + \frac{K_1 V^2}{B} = 0 \qquad (4b')$$

wherein all terms are positive if velocity V is negative, so that a stable system having negative roots results. Importantly, the same damping factor and natural frequency relationships as those obtained during forward travel result. This mathematical relationship illustrates how use of the invention allows a vehicle to be automatically steered in either direction with similar steering characteristics using only simple switching of the sign of the heading term in the command equation, as shown performed by switches S1 and S2 in FIG. 4 by way of example.

If one displaces the sensor longitudinally from the non-steered wheel axis, however, different conditions will exist for reverse travel than for forward travel in the absence of correction. Characteristic equation (4c) becomes $$p^2 - \left(\frac{K_2 + K_1 c}{B}\right) V p + \frac{K_1 V^2}{B} = 0 \qquad (4d)$$

for reverse travel. Thus, if the sensor is moved from the non-steered wheel axis toward the steerable wheel, damping tends to be increased for reverse travel, i.e. travel with the steerable wheel leading. However, with the relationships of equation (4d) in mind, one may now readily determine the $K_1$ and $K_2$ values that give a desired damping ratio, providing the same damping ratio for both directions of travel, or different ratios for different directions should that be desired. In FIG. 5, which applies to a vehicle where dimension c was zero, the same damping ratio was provided for both directions of travel because the $e_{13}'$ and $e_{46}'$ voltages are applied to summing amplifier A13 with the same scale factor for the two different directions. It will be readily apparent that the switches could be arranged to apply those voltages through different pairs of resistors when one wishes to change the scale factor, or the gain of amplifier A13 could be varied, as suggested by an added feedback resistor and a switch contact shown connected around amplifier A13. The switch contact could be operated by either switch S1 or switch S2 depending upon which scale factor one wished to be smaller.

If the sensor assembly of the differentially steered vehicle of FIG. 9 is displaced longitudinally by distance c from a position between the drive wheels, the characteristic equation of its system becomes:

$$p^2 + \frac{(K_2 + K_1 c)}{F} p + \frac{K_1 V}{F} = 0$$

where distance c is positive for rearward movement of the sensor. The natural frequency $\omega_n$ does not differ from the case where c is zero, but the damping factor becomes $$\zeta = \frac{K_2 - K_1 c}{2\sqrt{K_1 VF}}$$

so that for a damping ratio between 0.5 and 1.5 the relationship between $K_1$ and $K_2$ should lie between:

$$K_2 = \sqrt{FK_1 V} + K_1 c \text{ and } K_2 = 3\sqrt{FK_1 V} + K_1 c.$$

It will be apparent from the preceding discussion that one can also vary the longitudinal location off the sensor assembly in accordance with the above relationships to provide a desired damping constant, and as in the case of steerable wheel vehicles, a finite distance c will increase damping for one direction of travel and decrease it for the other.

In the description of FIGS. 4 and 5, the $K_1$ and $K_2$ values may be related to the sensor output voltages $e_{13}'$ and $e_{46}'$ as follows:

$K_1 = 2k\, G_1\, S$
$K_2 = k\, DG_2\, S$ where k is the sensitivity of the voltages $e_{13}'$ and $e_{46}'$ in volts per inch (or cm.) $G_1$ and $G_2$ are the gains used in providing the lateral displacement and heading portions, respectively, of the command signal, D is measured in inches (or cm.), and S is the position servo scale factor in dimensions of radians per volt, for example.

A wide variety of possible modifications to the specific circuits shown will readily occur to those skilled in the art after perusal of the foregoing disclosure. Many variations in the logic circuit of FIG. 8 could be made in accordance with standard techniques. Various of the amplifiers shown may incorporate various known drift and offset stabilization techniques.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. Automatic guidance apparatus for a ground vehicle operable in forward and reverse directions along a reference path defined by a current-carrying guidewire, comprising, in combination: a sensor assembly operative during both forward and reverse directions of travel to provide a first signal which varies in proportion to the lateral displacement of a first point on said vehicle from said reference path and to provide a second signal which varies in proportion to the heading deviation of a first axis of said vehicle from said reference path; means for combining said first and second signals using predetermined scale factors to provide a command signal during both forward and reverse directions of travel including means for reversing the sense of said second signal between forward and reverse directions of travel, said vehicle including steering means responsive to said command signal for steering said vehicle.

2. Apparatus according to claim 1 wherein said means for combining is operative to vary the ratio between said predetermined scale factors between said forward and reverse directions of travel.

3. Apparatus according to claim 1 wherein said sensor assembly comprises sensor means fixedly mounted on said vehicle for sensing the lateral displacements of two points on said sensor means from said reference path to provide third and fourth signals respectively commensurate with said displacements, and means for combining said third and fourth signals during both said forward and reverse directions of travel to provide said first and second signals.

4. Apparatus according to claim 1 wherein said vehicle includes a pair of non-dirigible wheels located on a laterally extending axis, wherein said steering means includes a steerable wheel situated a longitudinal wheelbase distance B from said laterally extending axis and a position servomechanism connected to receive said command signal and position said steerable wheel.

5. Apparatus according to claim 1 wherein said steering means comprises a pair of drive wheels mounted laterally apart a distance F on a second axis of said vehicle, and means for varying the relative speeds of said drive wheels.

6. Apparatus according to claim 1 wherein said vehicle includes traction motive means for driving said vehicle, and switching means responsive to said first signal commensurate with lateral displacement for controlling the operation of said traction motive means.

7. Apparatus according to claim 1 wherein said vehicle includes traction motive means for driving said vehicle, and switching means responsive to said second signal commensurate with heading deviation for controlling the operation of said traction motive means.

8. The vehicle according to claim 4 wherein said predetermined scale factors are selected to cause said command signal to vary in proportion to the relationship $K_1 d + K_2 \psi$, where $K_1$ and $K_2$ specify the sensitivity of response of said steering means to lateral displacement $d$ and heading deviation $\psi$, respectively, and wherein the relationship between $K_1$ and $K_2$ lies in between $K_2 = \sqrt{K_1 B} + K_1 c$ and $K_2 = 3\sqrt{K_1 B} + K_1 c$ for travel with said non-dirigible wheels leading said steerable wheel, and lies in between $K_2 = \sqrt{K_1 B} - K_1 c$ and $K_2 = 3\sqrt{K_1 B} - K_1 c$ for travel with said steerable wheel leading said non-dirigible wheels, where a c represents the longitudinal distance of said first point on said vehicle measured from said laterally extending axis toward said steerable wheel.

9. Apparatus according to claim 4 having switching means for varying between first and second values the amount which said servomechanism turns said steerable wheel per unit of magnitude of said command signal; and comparator means responsive to said first and second signals and operative when both said first and second signals decrease below respective predetermined values for operating said switching means to decrease said amount to said second value.

10. The vehicle according to claim 5 wherein said predetermined scale factors are selected to cause said command signal to vary in proportion to the relationship $K_1 d + K_2 \psi$, where $K_1$ and $K_2$ specify the sensitivity of response of said steering means to lateral displacement $d$ and heading deviation $\psi$, respectively, and wherein the relationship between $K_1$ and $K_2$ lies in between $K_2 = \sqrt{F K_1 V} + K_1 c$ and $K_2 3\sqrt{F K_1 V} + K_1 c$ for travel in one direction and lies in between $K_2 = \sqrt{F K_1 V} - K_1 c$ and $K_2 = 3\sqrt{F K_1 V} - K_1 c$ for travel in the opposite direction, where V is the speed of said vehicle and c is the longitudinal distance of said first point on said vehicle from said second axis measured in a direction opposite to the direction of travel.

11. The vehicle according to claim 6 wherein said switching means is operative to limit the speed of said traction motive means to a finite value when said first signal exceeds a first value and operative to stop said traction motive means when said first signal exceeds a second value.

12. The vehicle according to claim 6 having means for providing a fifth signal commensurate with the time rate of change of said third signal, said switching means being responsive to said fifth signal.

13. The vehicle according to claim 7 wherein said switching means is operative to limit the speed of said traction motive means to a finite value when said second signal exceeds a first value and operative to stop said traction motive means when said second signal exceeds a second value.

14. The vehicle according to claim 7 having means for providing a fifth signal commensurate with the time rate of change of said fourth signal, said switching means being responsive to said fifth signal.

15. A guided ground vehicle, comprising, in combination: sensor means operative to provide a first signal commensurate with lateral displacement of a point on said sensor means from a reference path defined by a current-carrying guidewire and a second signal commensurate with heading deviation of said sensor means from said reference path; means for combining said first and second signals to provide a steering command signal; a steerable wheel for steering said vehicle; a closed-loop position servomechanism connected to receive said steering command signal and to position said steerable wheel; switching means for varying between first and second values the amount which said servomechanism turns said steerable wheel per unit magnitude of said command signal; and comparator means responsive to said first and second signals and operative when both said first and second signals decrease below respective predetermined values for operating said switching means to decrease said amount to said second value.

16. The vehicle according to claim 15 having traction motor means and traction motor control means operative to limit vehicle speed to a finite value without stopping said vehicle, said comparator means being operative to disable said traction motor control means and allow vehicle speed to exceed said finite value when both said first and second signals decrease below said respective predetermined values.

17. The vehicle according to claim 16 wherein said switching means comprises a latch means connected to be set by said comparator means to decrease said amount when both said first and second signals have first decreased below said respective predetermined values and to remain set if either of said first and second signals thereafter exceeds its respective predetermined valsaid comparator means being connected to enable said traction motor control means to limit vehicle speed to said low finite value if either of said first and second signals thereafter exceeds its respective predetermined value.

18. The vehicle according to claim 16 having second traction motor control means responsive to said comparator means and operative to stop said traction means if either of said first and second signals exceeds a second respective predetermined value.

19. A sensor assembly for use on a guided ground vehicle having traction motor means for driving said vehicle, a steerable wheel for steering said vehicle, and a servomechanism connected to position said steerable wheel, comprising, in combination: a sensor having a plurality of coils affixed to said vehicle and operable to provide first and second voltages commensurate with displacements of said coils from a reference path defined by a current-carrying guidewire, means for combining said first and second voltages to provide a first signal commensurate with lateral displacement of said sensor from said reference path and to provide a second signal commensurate with heading deviation of said sensor from said reference path, means for combining said first and second signals to provide a steering command signal, said servomechanism being responsive to said steering command signal; and comparator means responsive to said first and second signals for controlling said traction motor means, said comparator means being operable to limit speed of said vehicle without stopping said vehicle while either said first signal or said second signal exceeds a respective first predetermined value.

20. The assembly according to claim 19 wherein said comparator means is operable to stop said vehicle if either said first signal or said second signal exceeds a respective second predetermined value greater than its respective first predetermined value.

21. The assembly according to claim 19 having switching means for varying between first and second values the amount which said servomechanism turns said steerable wheel per unit magnitude of said steering command signal, said comparator means including means for operating said switching means to decrease said amount to said second value when both said first and second signals decrease below respective predetermined values.

22. The assembly according to claim 19 wherein said vehicle is operable in forward and reverse directions said means for providing said steering command signal includes means for reversing the sense of said second signal between said forward and reverse directions.

23. The assembly according to claim 19 wherein said sensor includes first and second pairs of coils each arranged to straddle said guidewire, means for amplifying and rectifying voltages induced in said first pair to provide said first voltage, and means for amplifying and rectifying voltages induced in said second pair to provide said second voltage.

24. The assembly according to claim 21 wherein said switching means comprises a latch means connected to be set by said comparator means to decrease said amount when both said first and second signals have first decreased below said respective first predetermined values and to remain set if either of said first and second signals thereafter exceeds its respective predetermined value.

* * * * *